US012789614B2

(12) United States Patent
Zhao et al.

(10) Patent No.: US 12,789,614 B2
(45) Date of Patent: Nov. 10, 2026

(54) ALL-TERRAIN VEHICLE AND ASSEMBLY THEREOF

(71) Applicant: Segway Technology Co., Ltd., Changzhou (CN)

(72) Inventors: Jiajun Zhao, Changzhou (CN); Changwu Zou, Changzhou (CN); Wei Wang, Changzhou (CN)

(73) Assignee: Segway Technology Co., Ltd., Changzhou (CN)

( * ) Notice: Subject to any disclaimer, the term of this patent is extended or adjusted under 35 U.S.C. 154(b) by 220 days.

(21) Appl. No.: 18/828,747

(22) Filed: Sep. 9, 2024

(65) Prior Publication Data

US 2025/0091428 A1 Mar. 20, 2025

(30) Foreign Application Priority Data

| | | |
|---|---|---|
| Sep. 20, 2023 | (CN) | 202311222969.9 |
| Sep. 20, 2023 | (CN) | 202322562711.5 |
| Sep. 20, 2023 | (CN) | 202322566201.5 |
| Sep. 26, 2023 | (CN) | 202322625885.1 |

(51) Int. Cl.
*B60K 6/52* (2007.10)
*B60K 6/448* (2007.10)

(52) U.S. Cl.
CPC ................ *B60K 6/448* (2013.01); *B60K 6/52* (2013.01); *B60Y 2200/20* (2013.01); *B60Y 2200/92* (2013.01)

(58) Field of Classification Search
CPC ...... B60K 6/448; B60K 6/52; B60Y 2200/20; B60Y 2200/92
See application file for complete search history.

(56) References Cited

U.S. PATENT DOCUMENTS

2005/0224262 A1* 10/2005 Ima ........................ B60K 17/22 180/53.6
2022/0340229 A1* 10/2022 Dong ........................ B62K 5/01
2023/0234664 A1* 7/2023 Hu ........................ B60K 1/04

OTHER PUBLICATIONS

Notice of Allowance received in CN202322562711.5, dated Apr. 8, 2024, in 2 pages (with translation).
Notice of Allowance received in CN202322625885.1, dated Apr. 7, 2024, in 2 pages (with translation).
Notice of Allowance received in CN202322566201.5, dated May 3, 2024, in 2 pages (with translation).

* cited by examiner

*Primary Examiner* — Edwin A Young
(74) *Attorney, Agent, or Firm* — Procopio, Cory, Hargreaves & Savitch LLP

(57) ABSTRACT

A hybrid assembly is provided, including an engine, a gearbox, a battery, a first motor, a front axle and a hybrid rear axle, where the front axle, the battery, and the hybrid rear axle are arranged sequentially along a first direction, the battery is connected to the hybrid rear axle via the first motor, the engine and the gearbox are arranged between the battery and the hybrid rear axle, and the gearbox is arranged on a side of the engine facing the front axle; the engine is arranged along the first direction, an output end of the engine is connected to the gearbox along the first direction, the gearbox is connected to the front axle via a front transmission shaft arranged along the first direction, and the gearbox is connected to the hybrid rear axle via a rear transmission shaft arranged along the first direction.

20 Claims, 14 Drawing Sheets

ALL-TERRAIN VEHICLE AND ASSEMBLY THEREOF

CROSS-REFERENCE TO RELATED APPLICATIONS

The present application claims priority to Chinese Patent Application No. 202322562711.5, filed with the China National Intellectual Property Administration on Sep. 20, 2023, entitled "Hybrid Assembly", Chinese Patent Application No. 202311222969.9, filed with the China National Intellectual Property Administration on Sep. 20, 2023, entitled "Hybrid All-Terrain Vehicle", Chinese Patent Application No. 202322625885.1, filed with the China National Intellectual Property Administration on Sep. 26, 2023, entitled "Hybrid Assembly And All-Terrain Vehicle", and Chinese Patent Application No. 202322566201.5, filed with the China National Intellectual Property Administration on Sep. 20, 2023, entitled "Frame And All-Terrain Vehicle". The disclosures of the aforementioned applications are hereby incorporated by reference in their entireties.

TECHNICAL FIELD

The present application relates to the field of vehicle technology, and in particular to an all-terrain vehicle and an assembly thereof.

BACKGROUND

An all-terrain vehicle, also known as a beach buggy, is a vehicle with a unique design that can be driven on a complex terrain; it has sufficient ground clearance to allow it to be driven on an uneven terrain and is often used to cross a terrain (for example, a desert, a snowfield, a jungle, a mountain, etc.) where ordinary vehicles are difficult to move. With the advancement of technology, the driving mode of all-terrain vehicles has gradually evolved from being fuel-driven to a hybrid drive of fuel and electricity. Hybrid drive makes driving efficiency of all-terrain vehicles higher and makes all-terrain vehicles more environmentally friendly.

SUMMARY

In a first aspect of embodiments in the present application, a hybrid assembly is provided, including an engine, a gearbox, a battery, a first motor, a front axle and a hybrid rear axle, where the front axle, the battery, and the hybrid rear axle are arranged sequentially along a first direction, the battery is connected to the hybrid rear axle via the first motor, the engine and the gearbox are arranged between the battery and the hybrid rear axle, and the gearbox is arranged on a side of the engine facing the front axle; the engine is arranged along the first direction, an output end of the engine is connected to the gearbox along the first direction, the gearbox is connected to the front axle via a front transmission shaft arranged along the first direction, and the gearbox is connected to the hybrid rear axle via a rear transmission shaft arranged along the first direction.

The hybrid assembly provided in the first aspect of the embodiments in the present application, by arranging the engine longitudinally, enables the output end of the engine to be connected to the gearbox along the first direction, and enables the gearbox to be connected to the front axle and the hybrid rear axle via the front transmission shaft and the rear transmission shaft arranged along the first direction, respectively. As compared to solutions in the related art, there is no need to arrange a reduction gearbox in the present application, reducing a number of components in the hybrid assembly and improving transmission efficiency.

In a possible implementation, the first direction is parallel to a length direction of a vehicle body.

In a possible implementation, the gearbox is an automatic shift gearbox, the first motor is arranged on the hybrid rear axle, the battery is connected to the first motor via a high voltage cable, where a motor controller is arranged in the first motor, the motor controller is communicatively connected to the first motor, and the motor controller is configured to control a rotation direction of the first motor.

In a possible implementation, a controller is further included, where the controller is communicatively connected to the engine and the battery, the controller may control the engine and the battery to work at the same time or individually to cause the hybrid assembly to be in different working states.

In a possible implementation, when the hybrid assembly is in a first working state, the engine and the battery work at the same time, power output from the engine is transferred to the front axle and the hybrid rear axle via the gearbox, the battery enables the first motor to rotate, and power output from the first motor is transferred to the hybrid rear axle; when the hybrid assembly is in a second working state, the engine works individually, and the power output from the engine is transferred to the front axle and the hybrid rear axle via the gearbox; when the hybrid assembly is in a third working state, the battery works individually, the battery enables the first motor to rotate, and a part of the power output from the first motor is transferred to the hybrid rear axle, and the other part of the power output from the first motor is transferred to the front axle via the hybrid rear axle and the gearbox; when the hybrid assembly is in a fourth working state, the engine works individually, a part of the power output from the engine is transferred to the front axle and the hybrid rear axle via the gearbox, and the other part of the power output from the engine is transferred to the first motor via the hybrid rear axle, and the first motor converts kinetic energy into electrical energy and then charges the battery; and when the hybrid assembly is in a fifth working state, the engine works individually, the power output from the engine is transferred to the first motor via the hybrid rear axle, and the first motor converts kinetic energy into electrical energy and then charges the battery.

In a second aspect of the embodiments in the present application, a hybrid all-terrain vehicle is provided, including a frame, wheels, and the hybrid assembly as described in the first aspect and possible implementations of the first aspect, where the frame includes a cab and a power compartment arranged sequentially along the first direction, the battery is arranged in the cab, and the engine, the gearbox, and the first motor are arranged in the power compartment; and the wheels include a front wheel and a rear wheel, the front wheel is connected to the front axle via a front half shaft, and the rear wheel is connected to the hybrid rear axle via a rear half shaft.

The hybrid all-terrain vehicle provided in the second aspect of the embodiments in the present application, by arranging the engine longitudinally, enables the output end of the engine to be connected to the gearbox along the first direction, and enables the gearbox to be connected to the front axle and the hybrid rear axle via the front transmission shaft and the rear transmission shaft arranged along the first direction, respectively. As compared to solutions in the related art, there is no need to arrange a reduction gearbox in the present application, reducing the number of components in the hybrid assembly and improving the transmission efficiency.

In a possible implementation, the cab further includes a seat, the battery is arranged under the seat, and the engine, the gearbox, and the first motor are all arranged on a side of the seat facing the rear wheel.

In a third aspect of the embodiments in the present application, a hybrid power assembly is provided, including a drive axle, an engine, an electric motor, a first output shaft, a second output shaft, a first half shaft and a second half shaft; where the drive axle includes a first input shaft and a second input shaft arranged in parallel, the first input shaft being in transmission connection with an output end of the engine and the second input shaft being in transmission connection with an output of the electric motor; the first output shaft and the second output shaft are respectively in transmission connection with the drive axle and arranged on two sides of the drive axle; the first half shaft is located on a side of the first output shaft and is in transmission connection with the first output shaft; and the second half shaft is located on a side of the second output shaft and is in transmission connection with the second output shaft.

The hybrid power assembly provided in the third aspect of the embodiments in the present application has the drive axle provided with the first input shaft and the second input shaft which are in parallel, and the drive axle is in transmission connection with the output end of the engine via the first input shaft and is in transmission connection with the output end of the electric motor via the second input shaft, that is, that power of the engine and the electric motor can be jointly input into the drive axle is realized. Further, the first output shaft and the second output shaft are respectively in transmission connection with an output end of the drive axle, and the first output shaft transmits power to a wheelset via the first half shaft, and the second output shaft transmits power to the wheelset via the second half shaft. As a result, the power of the engine and the electric motor in the embodiments of the present application can be jointly input into the drive axle, and the electric motor can quickly reach maximum torque at startup, which can enable an all-terrain vehicle to quickly reach the maximum torque at startup, improve starting acceleration performance, and then improve user experience.

In a possible implementation, the drive axle further includes a first transmission wheelset, a second transmission wheelset, and an output gear; where the first transmission wheelset includes a first gear and a second gear, the first gear and the second gear being sleeved on the first input shaft and rotating synchronously; the first gear is in transmission connection with the second transmission wheelset, the second gear is engaged with the output gear, and the output gear is respectively in transmission connection with the first output shaft and the second output shaft, and the second transmission wheelset includes a third gear being in transmission connection with the first gear, and the third gear is sleeved on the second input shaft.

In a possible implementation, a rotation axis of the output gear is staggered with a rotation axis of the second gear.

In a possible implementation, the hybrid power assembly further includes a third transmission wheelset and a transmission shaft; where the transmission shaft is arranged in parallel between the first input shaft and the second input shaft, the third transmission wheelset includes a fourth gear and a fifth gear with different numbers of teeth, the fourth gear is engaged with the third gear, and the fifth gear is engaged with the first gear; and the fourth gear and the fifth gear are sleeved on the transmission shaft and rotate synchronously.

In a possible implementation, the drive axle further includes a gear case, and the first input shaft, the second input shaft, and the transmission shaft are in rotation connection within the gear case; and the first transmission wheelset, the second transmission wheelset, and the third transmission wheelset are all arranged in the gear case.

In a possible implementation, a lubricating oil and a lubricating gear are arranged in the gear case; and the lubricating gear is engaged with the fourth gear, and a part of the lubricating gear is submerged below a liquid surface of the lubricating oil.

In a possible implementation, the engine further includes a gearbox; the output end of the engine is in transmission connection with an input shaft of the gearbox, and an output shaft of the gearbox is in transmission connection with the first input shaft; the first input shaft has a first plug-in mounting hole, and the output shaft of the gearbox is plugged into the first plug-in mounting hole and connected by a keyway; and the second input shaft has a second plug-in mounting hole, and a drive shaft of the electric motor is plugged into the second plug-in mounting hole and connected by a keyway.

The fourth aspect of the embodiments in the present application provides an all-terrain vehicle, including a frame, a wheelset and the hybrid power assembly as described in the third aspect and possible implementations of the third aspect; where the hybrid power assembly includes a first half shaft and a second half shaft, the first half shaft and the second half shaft being respectively in transmission connection with the output end of the drive axle; and the hybrid power assembly is mounted on the frame, and the first half shaft and the second half shaft are respectively connected to a rear wheel or a front wheel of the wheel set.

The all-terrain vehicle provided in the fourth aspect of the embodiments in the present application includes a hybrid power assembly, which has the drive axle provided with the first input shaft and the second input shaft which are in parallel, and the drive axle is in transmission connection with the output end of the engine via the first input shaft and is in transmission connection with the output end of the electric motor via the second input shaft, that is, that the power of the engine and the electric motor can be jointly input into the drive axle is realized. Further, the first output shaft and the second output shaft are respectively in transmission connection with the output end of the drive axle, and the first output shaft transmits power to the wheelset via the first half shaft, and the second output shaft transmits power to the wheelset via the second half shaft. As a result, the power of the engine and the electric motor in the embodiment of the present application can be jointly input into the drive axle, and the electric motor can quickly reach maximum torque at startup, which can enable an all-terrain vehicle to quickly reach the maximum torque at startup, improve starting acceleration performance, and then improve user experience.

In a possible implementation, along a driving direction of the all-terrain vehicle, the frame includes a first space and a second space, where the first space is configured as a cab; and the hybrid power assembly is mounted in the second space and is in transmission connection with the rear wheel of the wheel set.

In a fifth aspect of the embodiments in the present application, a frame is provided, including: a main frame body, a first adapter frame and a second adapter frame, where a mounting cavity is formed in the main frame body, the first adapter frame is used for mounting a rear axle, the second adapter frame is used for mounting an engine rear overhang, one of the first adapter frame and the second adapter frame is arranged adjacent to one side of a width direction of the main frame body and the other is arranged adjacent to the other side of the width direction of the main frame body, and the first adapter frame and the second adapter frame are both arranged in the mounting cavity and both are detachably connected to the main frame body.

As for the frame provided in the fifth aspect of the embodiments in the present application, since the rear axle and the engine rear overhang are respectively mounted to the first adapter frame and the second adapter frame, the first adapter frame or the second adapter frame can be removed from the main frame body individually without interfering with each other when there is need to detach the rear axle or the engine rear overhang, thereby facilitating detachment of the all-terrain vehicle, and since the first adapter frame and the second adapter frame are arranged on two sides of the width direction of the main frame body respectively, an operator can detach the rear axle or the engine rear overhang at one side of the width direction of the frame. Therefore, the frame in the embodiments of the present application has a reasonable structural design and is easy to be detached and repaired.

In a possible implementation, the first adapter frame and the second adapter frame are detachably connected.

In a possible implementation, the frame further includes a first vertical fender frame, where the first vertical fender frame is mounted on a side of the width direction of the main frame body and arranged adjacent to the first adapter frame, and the first vertical fender frame extends along a third direction of the main frame body and is detachably connected to the main frame body.

In a possible implementation, the first adapter frame includes a first section and a second section, where the first section extends along the width direction of the main frame body, the second section extends along a first direction of the main frame body, one end of the first section along the extension direction thereof is detachably connected to the second adapter frame, and the other end of the first section along the extension direction thereof is detachably connected to the first vertical fender frame, a front end of the second section is connected to the first section, and a rear end of the second section is detachably connected to the main frame body; and the first vertical fender frame includes a fender frame body and two connecting seats, the two connecting seats are respectively arranged at two ends of the fender frame body, at least two first mounting positions are arranged on the connecting seats, at least two first cooperating positions are arranged on the main frame body, and the first mounting positions and the first cooperating positions one-to-one corresponding to each other and are connected by screw elements.

In a possible implementation, the frame further includes a second vertical fender frame, where the second vertical fender frame is mounted on a side of the width direction of the main frame body and arranged adjacent to the second adapter frame, and the second vertical fender frame extends along the third direction of the main frame body and is detachably connected to the main frame body; and the second adapter frame includes a third section and a fourth section, the third section extends along the width direction of the main frame body, the fourth section extends along the third direction of the main frame body, one end of the third section along the extension direction thereof is detachably connected to the second vertical fender frame, the other end of the third section along the extension direction thereof is detachably connected to the first adapter frame, an upper end of the fourth section is connected to the third section, and a lower end of the fourth section is detachably connected to the main frame body.

In a possible implementation, the frame further includes a motor fixing seat, where the motor fixing seat is used for mounting a second motor, the motor fixing seat is arranged at a front end of the first adapter frame, and the motor fixing seat is arranged in the mounting cavity and is detachably connected to the main frame body.

In a possible implementation, the frame further includes a cargo box mounting frame, where the cargo box mounting frame is arranged on an upper side of the mounting cavity, and the cargo box mounting frame is detachably connected to the main frame body.

In a sixth aspect of the embodiments in the present application, an all-terrain vehicle is provided, including: a frame, the frame being the frame as described in the fifth aspect and possible implementations of the fifth aspect; a rear axle, the rear axle being connected to the first adapter frame; and an engine rear overhang, the engine rear overhang being connected to the second adapter frame.

As for the all-terrain vehicle provided in the sixth aspect of the embodiments in the present application, since the rear axle and the engine rear overhang are respectively mounted to the first adapter frame and the second adapter frame, the first adapter frame or the second adapter frame can be removed from the main frame body individually without interfering with each other when there is need to detach the rear axle or the engine rear overhang, thereby facilitating detachment of the all-terrain vehicle, and since the first adapter frame and the second adapter frame are arranged on two sides of the width direction of the main frame body, respectively, an operator can detach the rear axle or the engine rear overhang at one side of the width direction of the frame. Therefore, the all-terrain vehicle in the embodiments of the present application has a reasonable structural design and is easy to be detached and repaired.

BRIEF DESCRIPTION OF DRAWINGS

To describe the embodiments of the present application or technical solutions in related technologies more clearly, drawings required for describing the embodiments or the related technologies will be introduced briefly in the following. Obviously, the drawings in following descriptions are some embodiments of the present application, and a person of ordinary skill in the art may still derive other drawings from these drawings without creative efforts.

REFERENCE SIGNS

Figure 1:
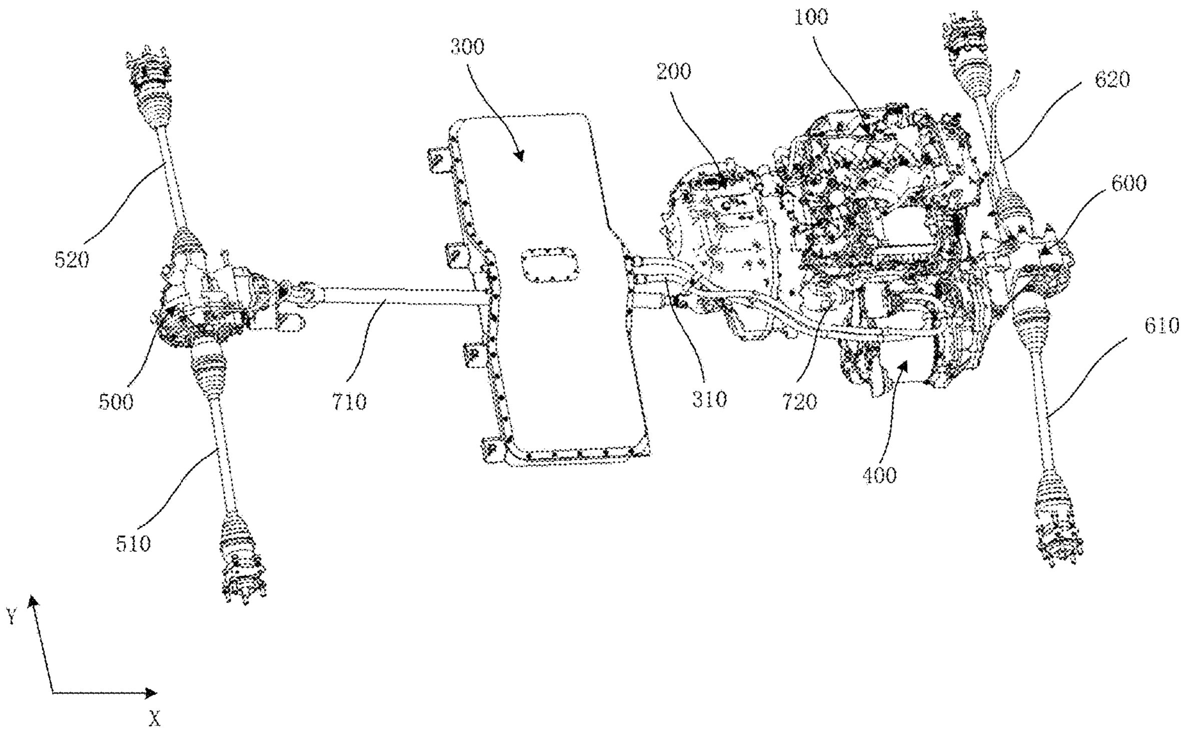
FIG. 1 is a structural diagram of a hybrid assembly provided by an embodiment of the present application.

100—engine;
200—gearbox;
300—battery; 310—high voltage cable;
400—first motor;
500—front axle; 510—front left half shaft; 520—front right half shaft;
600—hybrid rear axle; 610—rear left half shaft; 620—rear right half shaft;
710—front transmission shaft; 720—rear transmission shaft;
800—hybrid power assembly;
900—drive axle;
910—first input shaft; 920—second input shaft;
930—first transmission wheelset;
9310—first gear; 9320—second gear;
940—output gear;
950—third gear;
960—third transmission wheelset;
9610—fourth gear; 9620—fifth gear;
970—transmission shaft; 980—lubricating gear;
9910—first output shaft; 9920—second output shaft;
1000—electric motor;
1100—output shaft of gearbox;
1210—first half shaft;
1220—second half shaft;
1300, 1400—frame;
1310—first space; 1320—second space; 1410—main frame body; 1411—mounting cavity; 1420—first adapter frame; 1421—first section; 1422—second section; 1430—second adapter frame; 1431—third section; 1432—fourth section; 1440—first vertical fender frame; 1441—fender frame body; 1442—connecting seat; 1450—second vertical fender frame; 1460—motor fixing seat; 1470—cargo box mounting frame;
1500—rear axle;
1600—engine rear overhang;
1700—second motor;
X—first direction; Y—second direction; Z—third direction.

DESCRIPTION OF EMBODIMENTS

In order to make purposes, technical solutions, and advantages of the embodiments in the present application clearer, the technical solutions in the embodiments of the present application will be described clearly and completely in the following in combination with the drawings in the embodiments of the present application. Obviously, the described embodiments are a part of the embodiments in the present application, not all of the embodiments.

Based on the embodiments in the present application, all other embodiments derived by a person of ordinary skill in the art without creative efforts shall fall within protection scope of the present application. Without conflict, embodiments and features in the embodiments described in the following may be combined with each other.

In the related art, an all-terrain vehicle with a hybrid drive method has a hybrid assembly which generally includes an engine, a gearbox, a reduction gearbox, an electric generator, a drive motor, and a battery, etc. The engine is arranged transversely (i.e., in a width direction of a vehicle body), an output end of the engine is connected to the gearbox, an output end of the gearbox is connected to the reduction gearbox, and the reduction gearbox converts a direction of power before delivering the power to a front axle and/or a rear axle via a front transmission shaft and a rear transmission shaft, respectively, in order to drive a front wheel and a rear wheel to move. However, in the related art, since the engine is arranged transversely, a direction of power output from the gearbox needs to be converted by the reduction gearbox before the power can be delivered to the front axle and/or the rear axle, which results in a large number of components and low transmission efficiency. In addition, the gearbox is a CVT gearbox, and a belt thereof is a rubber belt, which is prone to breakage and has poor transmission reliability. In addition, in solutions in the related art, functions of the electric generator and the drive motor are independent of each other; the battery may output power to the front axle and/or the rear axle via the drive motor to drive the front wheel and the rear wheel to move; and the electric generator may charge the battery to replenish electrical energy. This also increases the overall number of components to some extent.

In response to the above technical problems, a hybrid assembly and a hybrid all-terrain vehicle are provided in the embodiments of the present application, where an engine is arranged longitudinally, causing that an output end of the engine is connected to a gearbox along a length direction of a vehicle body, and the gearbox is respectively connected to a front axle and a hybrid rear axle via a front transmission shaft and a rear transmission shaft arranged along the length direction of the vehicle body to drive a front wheel and a rear wheel to rotate. Consequently, there is no need to arrange a reduction gearbox, which reduces a number of components in the hybrid assembly, and improves transmission efficiency. By selecting and using an automatic shift gearbox, the transmission efficiency is thus improved and transmission reliability is better. By connecting a first motor to a hybrid rear axle as a single unit, the first motor can rotate in different directions under control of a motor controller, functions of an electric generator and a drive motor in the related art can thus be realized at the same time, and the number of components can be further reduced.

Contents of the embodiments in the present application will be described in detail below in combination with the drawings, so that a person skilled in the art can understand contents of the present application in greater detail.

It should be noted that in these embodiments, a first direction X and a second direction Y are two different directions perpendicular to each other, where the first direction X may be, for example, parallel to a length direction of a vehicle body, which may be a driving direction of an all-terrain vehicle, i.e., a forward direction and a backward direction; the second direction Y may be, for example, parallel to a width direction of the vehicle body, which may be left and right directions of the all-terrain vehicle, i.e., the second direction is consistent with the width direction of the all-terrain vehicle; and the third direction Z may be, for example, parallel to a height direction of the vehicle body, which may be upper and lower directions of the all-terrain vehicle, i.e. the third direction is consistent with the height direction of the all-terrain vehicle.

FIG. 1 is a structural diagram of a hybrid assembly provided by an embodiment of the present application. Referring to FIG. 1, the present embodiment provides a hybrid assembly, where the hybrid assembly may be arranged below a frame and attached to a chassis. In a possible implementation, the frame may be made of a metal material, and wheels may include a front wheel and a rear wheel.

Specifically, the hybrid assembly includes an engine 100, a gearbox 200, a battery 300, a first motor 400, a front axle 500, and a hybrid rear axle 600. The front axle 500, the battery 300, and the hybrid rear axle 600 are arranged sequentially along a first direction X, where the front axle 500 is arranged at a front end of a vehicle body, the hybrid rear axle 600 is arranged at a rear end of the vehicle body, and the battery 300 is arranged in a middle part of the vehicle body, which may be arranged, for example, under a seat. The battery 300 is connected to the hybrid rear axle 600 via the first motor 400, thereby driving the hybrid rear axle 600 to rotate. The engine 100 and the gearbox 200 are arranged between the battery 300 and the hybrid rear axle 600, and the gearbox 200 is arranged on a side of the engine 100 facing the front axle 500; that is, both the engine 100 and the gearbox 200 in this implementation are rear-mounted.

Further, the engine 100 in the present embodiment is arranged along the first direction X (i.e., the engine is arranged longitudinally), an output end of the engine 100 is connected to the gearbox 200 along the first direction X, the gearbox 200 is connected to the front axle 500 via a front transmission shaft 710 arranged along the first direction X, and the front axle 500 is connected to the front wheel via a front half shaft. Specifically, the front half shaft includes a front left half shaft 510 and a front right half shaft 520; the front wheel includes a front left wheel and a front right wheel; and the front axle 500 is connected to the front left half shaft 510 and the front right half shaft 520 along a second direction Y, respectively, to drive the front left wheel and the front right wheel to rotate. The gearbox 200 is connected to the hybrid rear axle 600 via a rear transmission shaft 720 arranged along the first direction X, and the hybrid rear axle 600 is connected to the rear wheel via a rear half shaft. Specifically, the rear half shaft includes a rear left half shaft 610 and a rear right half shaft 620; the rear wheel includes a rear left wheel and a rear right wheel; and the hybrid rear axle 600 is connected to the rear left half shaft 610 and the rear right half shaft 620 along the second direction Y, respectively, to drive the rear left wheel and the rear right wheel to rotate, in order to realize an operation of a vehicle.

The frame includes a cab and a power compartment arranged sequentially along the first direction X, the battery 300 is arranged in the cab, and the engine 100, the gearbox 200, and the first motor 400 are arranged in the power compartment.

Specifically, the cab further includes a seat, and the battery 300 is arranged under the seat, thereby facilitating full utilization of space and reducing volume of the vehicle. The engine 100, the gearbox 200, and the first motor 400 are all arranged on a side of the seat facing the rear wheel, that is, an all-terrain vehicle in the present embodiment is a rear-engine vehicle.

In the present embodiment, the hybrid rear axle 600 may couple power output from the engine 100 with power output from the first motor 400, thereby jointly driving the vehicle to operate, and realizing the purpose of hybrid drive.

In the present embodiment, the engine 100 is arranged longitudinally, causing that the output end of the engine 100 is connected to the gearbox 200 along the first direction X, and the gearbox 200 is connected to the front axle 500 and the hybrid rear axle 600 via the front transmission shaft 710 and the rear transmission shaft 720 arranged along the first direction X, respectively. As compared to the solutions in the related art, there is no need to arrange a reduction gearbox to change the direction in the present application, thereby reducing a number of components in the hybrid assembly and improving transmission efficiency.

In one possible implementation, the gearbox 200 in the present embodiment is an automatic shift gearbox. Power which passes through the automatic shift gearbox is mainly transmitted via gears, shafts and other structure, which are arranged compactly and have a high transmission efficiency. Compared to the solutions in the related art, a risk of belt breakage during use of a CVT gearbox is avoided, thereby increasing reliability of transmission. In the present embodiment, specific models of the engine 100 and the gearbox 200 may be selected as desired, for example, the engine 100 may be an engine with a displacement of 1.5 T, 2.0 T, or 2.5 T, and the gearbox 200 may be an AMT, AT, or DHT gearbox.

In a possible implementation, the first motor 400 in the present embodiment is arranged on the hybrid rear axle 600, which means that the first motor 400 is connected to the hybrid rear axle 600 as a single unit, and a specific connection may be mechanical (e.g., the connection is realized by means of a structure such as a shaft, a spline, etc.). The battery 300 is connected to the first motor 400 via a high voltage cable 310, thereby realizing energy transfer between the battery 300 and the first motor 400.

It should be noted that a motor controller is further integrated in the first motor 400 in the present embodiment, and the motor controller and the first motor 400 are integrally formed to cause overall size to be smaller. The motor controller may control a rotation direction of the first motor 400, to cause the first motor 400 to output power to the hybrid rear axle 600 or charge the battery 300.

In a possible implementation, a controller (not shown in the figure) is further included in the present embodiment, where the controller is communicatively connected to the engine 100 and the battery 300, and the controller may control the engine 100 and the battery 300 to work at the same time or individually, to cause the hybrid assembly to be in different working states.

Figure 2:
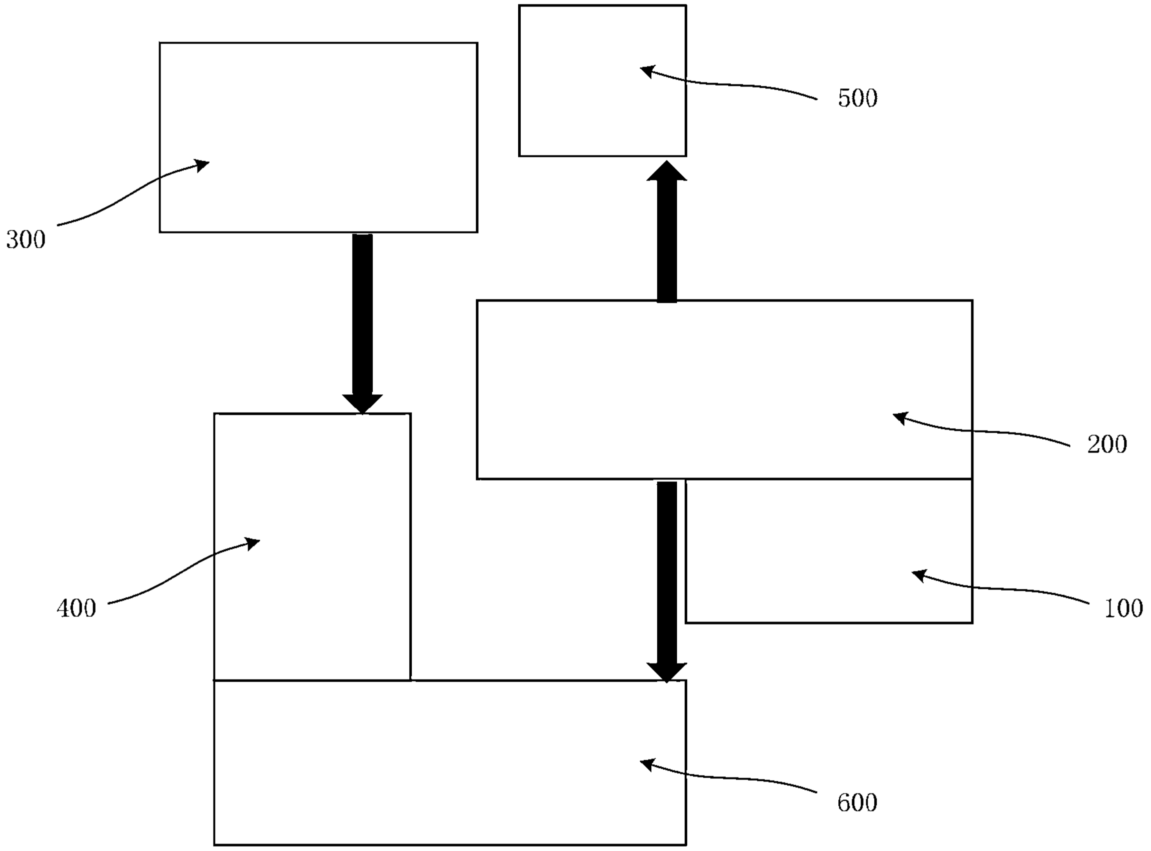
FIG. 2 is a schematic diagram of energy transfer of the hybrid assembly provided by the embodiment of the present application in a first working state.

Specifically, FIG. 2 is a schematic diagram of energy transfer of the hybrid assembly provided by the embodiment of the present application in a first working state. Referring to FIG. 2, when the hybrid assembly is in the first working state, the engine 100 and the battery 300 work at the same time. At this time, power output from the engine 100 is transferred to the front axle 500 and the hybrid rear axle 600 via the gearbox 200, the battery 300 enables the first motor 400 to rotate, and power output from the first motor 400 is transferred to the hybrid rear axle 600. The power output from the engine 100 drives the front left wheel and the front right wheel to rotate via the front left half shaft 510 and the front right half shaft 520 which are connected to the front axle 500; and the hybrid rear axle 600 couples the power output from the engine 100 with the power output from the first motor 400, and then drives the rear left wheel and the rear right wheel to rotate via the rear left half shaft 610 and the rear right half shaft 620.

FIG. 2 shows a four-wheel drive mode (that is, the front left wheel, the front right wheel, the rear left wheel, and the rear right wheel can provide drive force at the same time); and in other possible implementations, a two-wheel drive mode (that is, drive force is provided only by the rear left wheel and the rear right wheel at the same time) may also be used, and at this time, all power output from the engine 100 is transferred to the hybrid rear axle 600 via the gearbox 200.

The first working state may also be referred to as a full-performance state, where the engine 100 and the battery 300 work at the same time to cause the hybrid assembly to have a larger output power, thereby causing the vehicle to have a better acceleration performance and enhancing driving experience.

Figure 3:
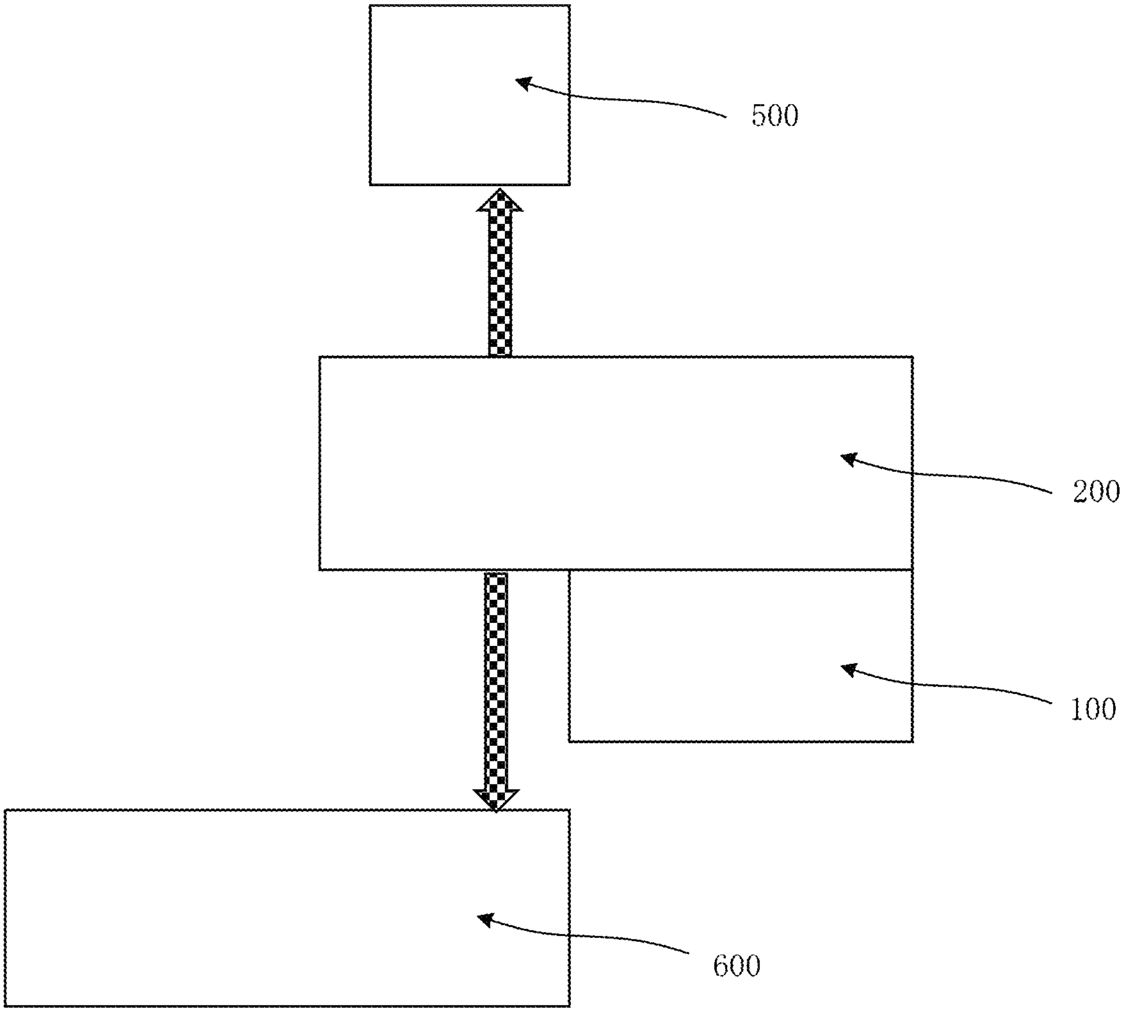
FIG. 3 is a schematic diagram of energy transfer of the hybrid assembly provided by the embodiment of the present application in a second working state.

FIG. 3 is a schematic diagram of energy transfer of the hybrid assembly provided by the embodiment of the present application in a second working state. Referring to FIG. 3, the engine 100 works individually when the hybrid assembly is in the second working state. The power output from the engine 100 is transferred to the front axle 500 and the hybrid rear axle 600 via the gearbox 200. The power output from engine 100 drives the front left wheel and the front right wheel to rotate via the front left half shaft 510 and the front right half shaft 520 which are connected to the front axle 500; and the power output from the engine 100 drives the rear left wheel and the rear right wheel to rotate via the rear left half shaft 610 and the rear right half shaft 620 which are connected to the hybrid rear axle 600.

FIG. 3 shows a four-wheel drive mode (that is, the front left wheel, the front right wheel, the rear left wheel, and the rear right wheel can provide drive force at the same time); and in other possible implementations, a two-wheel drive mode (that is, drive force is provided only by the rear left wheel and the rear right wheel at the same time) may also be used, and at this time, all power output from the engine 100 is transferred to the hybrid rear axle 600 via the gearbox 200.

The second working state may also be referred to as a pure fuel state, and refueling of the engine 100 is more convenient, which can reduce trouble brought by driving mileage.

Figure 4:
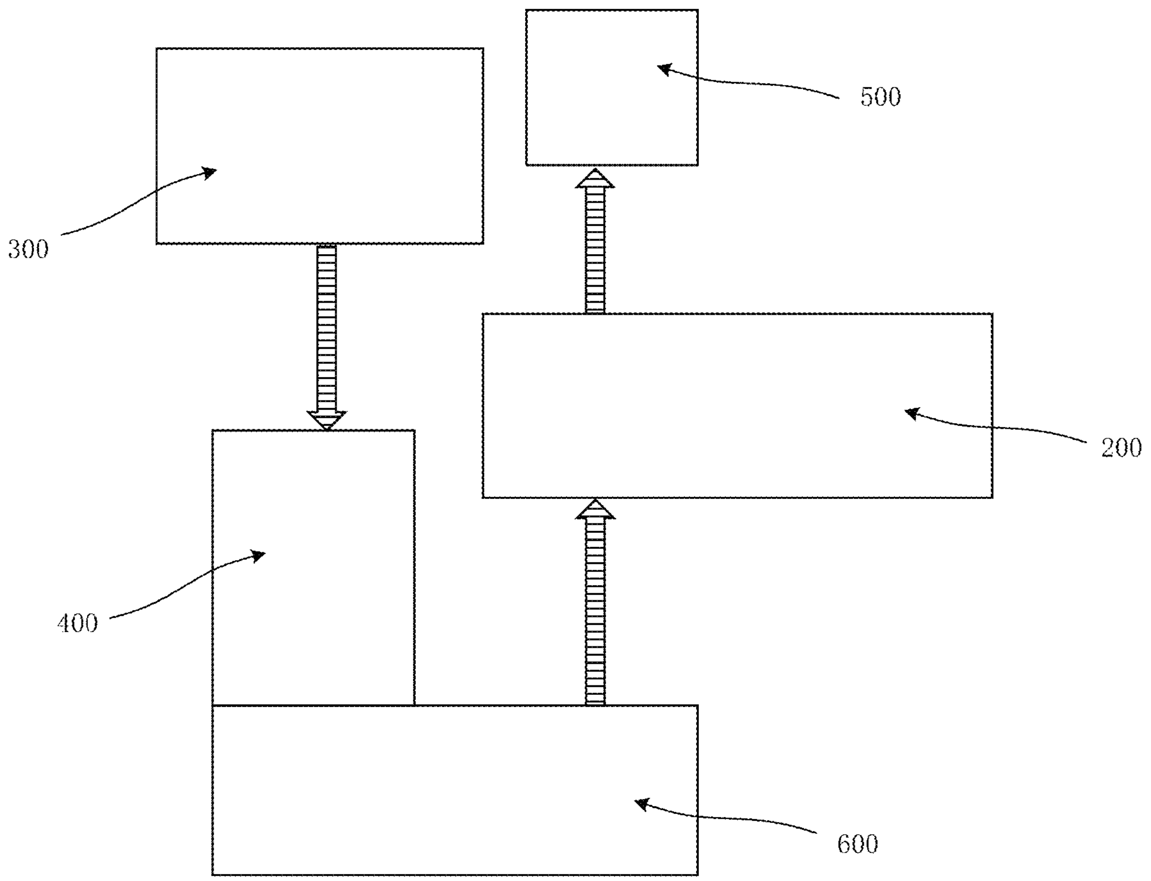
FIG. 4 is a schematic diagram of energy transfer of the hybrid assembly provided by the embodiment of the present application in a third working state.

FIG. 4 is a schematic diagram of energy transfer of the hybrid assembly provided by the embodiment of the present application in a third working state. Referring to FIG. 4, the battery 300 works individually when the hybrid assembly is in the third working state. The battery 300 enables the first motor 400 to rotate, and a part of the power output from the first motor 400 is transferred to the hybrid rear axle 600, to drive the rear left wheel and the rear right wheel to rotate via the rear left half shaft 610 and the rear right half shaft 620 which are connected to the hybrid rear axle 600. The other part of the power output from the first motor 400 is transferred to the front axle 500 via the hybrid rear axle 600 and the gearbox 200, to drive the front left wheel and the front right wheel to rotate via the front left half shaft 510 and the front right half shaft 520 which are connected to the front axle 500.

FIG. 4 shows a four-wheel drive mode (that is, the front left wheel, the front right wheel, the rear left wheel, and the rear right wheel can provide drive force at the same time); and in other possible implementations, a two-wheel drive mode (that is, drive force is provided only by the rear left wheel and the rear right wheel at the same time) may also be used, and at this time, all the power output from the first motor 400 is transferred to the hybrid rear axle 600.

The third working state may also be referred to as a pure electric state, which can reduce fuel consumption and has lower noise during driving.

Figure 5:
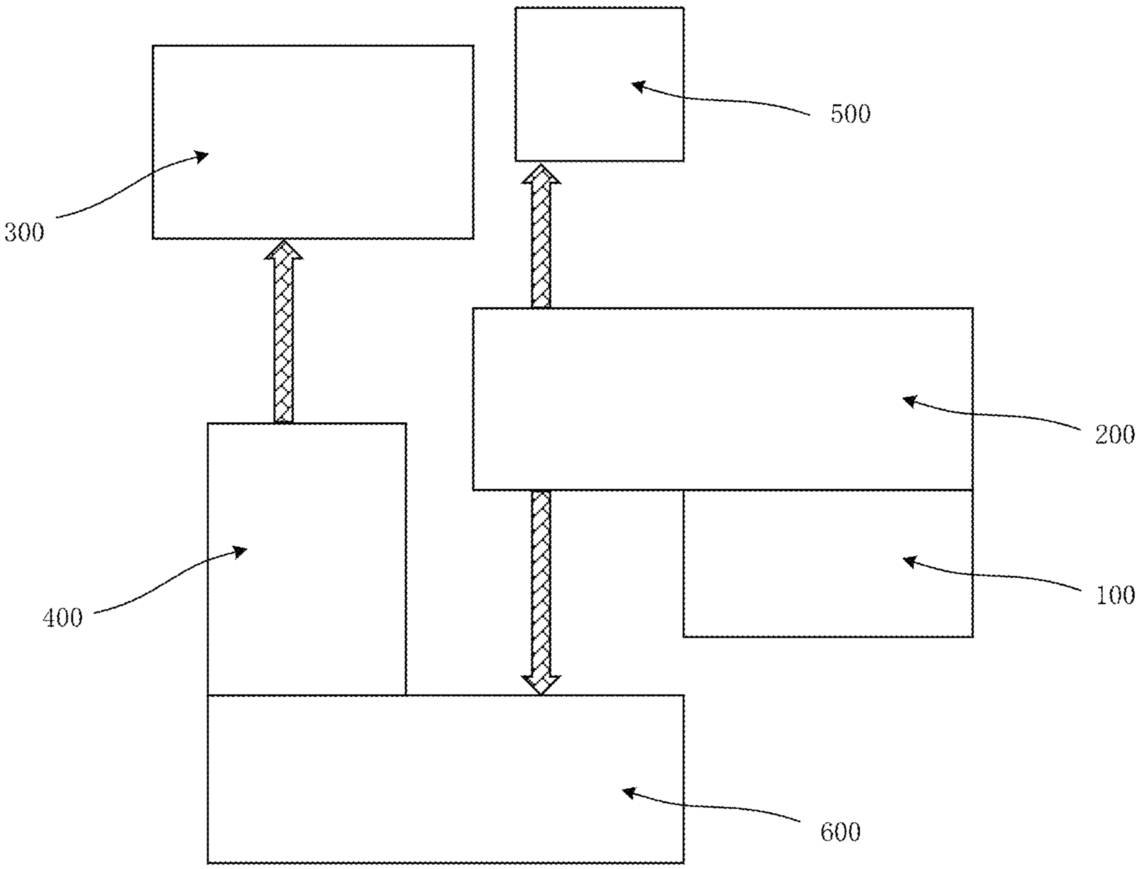
FIG. 5 is a schematic diagram of energy transfer of the hybrid assembly provided by the embodiment of the present application in a fourth working state.

FIG. 5 is a schematic diagram of energy transfer of the hybrid assembly provided by the embodiment of the present application in a fourth working state. Referring to FIG. 5, the engine 100 works individually when the hybrid assembly is in the fourth working state. A part of the power output from the engine 100 is transferred to the front axle 500 and the hybrid rear axle 600 via the gearbox 200, to drive the front left wheel and the front right wheel to rotate via the front left half shaft 510 and the front right half shaft 520 which are connected to the front axle 500, and to drive the rear left wheel and the rear right wheel to rotate via the rear left half shaft 610 and the rear right half shaft 620 which are connected to the hybrid rear axle 600. The other part of the power output from the engine 100 is transferred to the first motor 400 via the hybrid rear axle 600, and the first motor 400 converts kinetic energy into electrical energy and then charges the battery 300.

FIG. 5 shows a four-wheel drive mode (that is, the front left wheel, the front right wheel, the rear left wheel, and the rear right wheel can provide drive force at the same time); and in other possible implementations, a two-wheel drive mode (that is, drive force is provided only by the rear left wheel and the rear right wheel at the same time) may also be used, at this time, a part of the power output from the engine 100 is entirely transferred to the hybrid rear axle 600 via the gearbox 200, and the other part of the power output from the engine 100 is transferred to the first motor 400 via the hybrid rear axle 600, and the first motor 400 converts kinetic energy into electrical energy and then charges the battery 300.

The fourth working state may also be referred to as a driving charging state, where the battery 300 can be charged during driving, which is suitable for situations where the driving is not very intense and the engine 100 has sufficient power.

Figure 6:
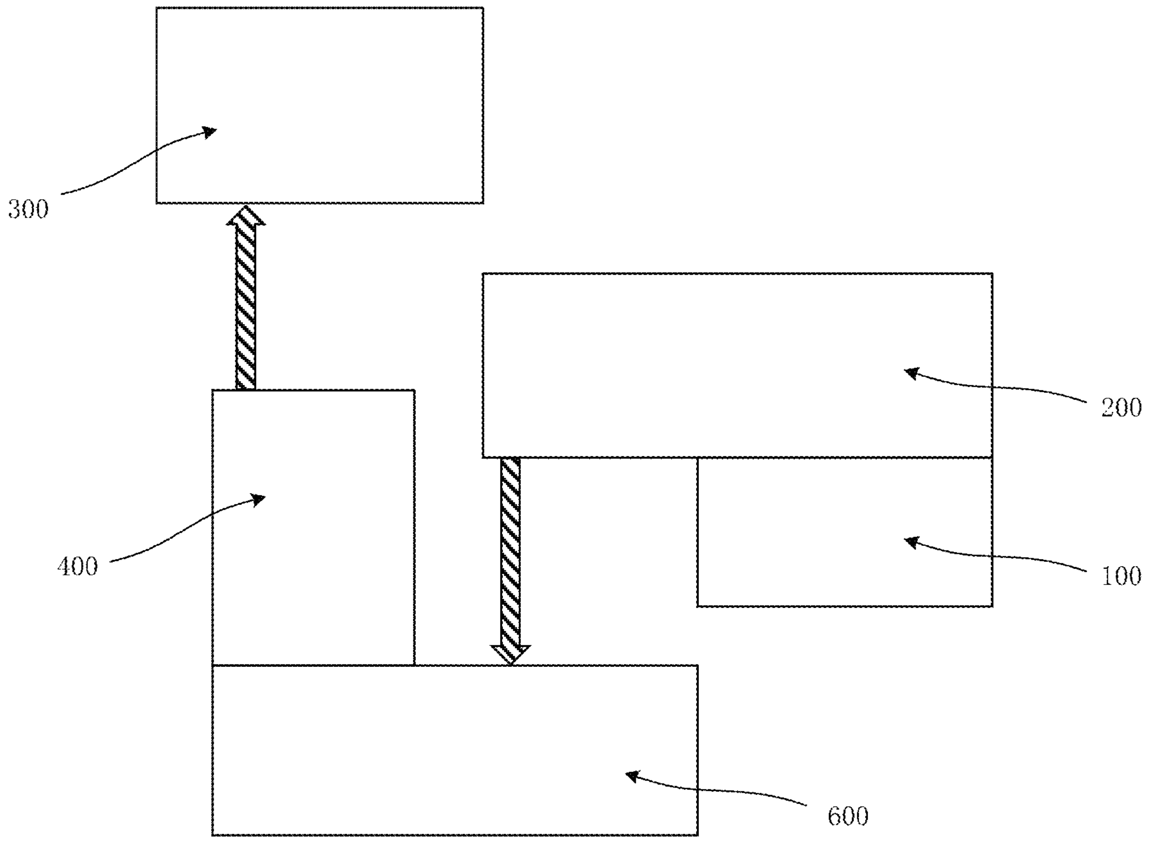
FIG. 6 is a schematic diagram of energy transfer of the hybrid assembly provided by the embodiment of the present application in a fifth working state.

FIG. 6 is a schematic diagram of energy transfer of the hybrid assembly provided by the embodiment of the present application in a fifth working state. Referring to FIG. 6, when the hybrid assembly is in the fifth working state, the engine 100 works individually, and the power output from the engine 100 is transferred to the first motor 400 via the hybrid rear axle 600, and the first motor 400 converts kinetic energy into electrical energy and then charges the battery 300.

The fifth working state may also be referred to as a parking charging state, where the battery 300 can be charged when the vehicle stops running, which is suitable for situations where no external charging equipment is available.

As can be seen from the above descriptions, the hybrid assembly in the present embodiment may select different working states as needed to meet the needs in different situations.

On the other hand, in the related art, all-terrain vehicles have poor starting acceleration performance, which affects user experience. The inventors have found that the reason for this problem is that a current all-terrain vehicle has only one axle power input shaft, which is connected to an engine power output shaft. Therefore, the power input of the all-terrain vehicle only relies on the engine output shaft to transfer power to the axle power input shaft. Furthermore, since the engine starting speed cannot be increased instantaneously and cannot reach a maximum torque output, the starting acceleration performance is poor.

For the above technical problem, the embodiments of the present application provide a hybrid power assembly and an all-terrain vehicle, where a drive axle of the hybrid power assembly is provided with a first input shaft and a second input shaft, and is in transmission connection with an output end of an engine via the first input shaft and is connected to an output end of an electric motor via the second input shaft. An end of the first input shaft is connected to an output gear to transfer power of the engine to the output gear; and the first input shaft is coupled to the second input shaft via a first transmission wheelset and a second transmission wheelset, capable of transferring power of the electric motor to the output gear. With such an arrangement, the power of the engine and the electric motor in the embodiment of the present application can be jointly input into the drive axle. Based on characteristics of electric drive, the electric motor can quickly reach maximum torque at startup, which can enable an all-terrain vehicle to quickly reach the maximum torque at startup, improve starting acceleration performance, and then improve user experience.

Figure 7:
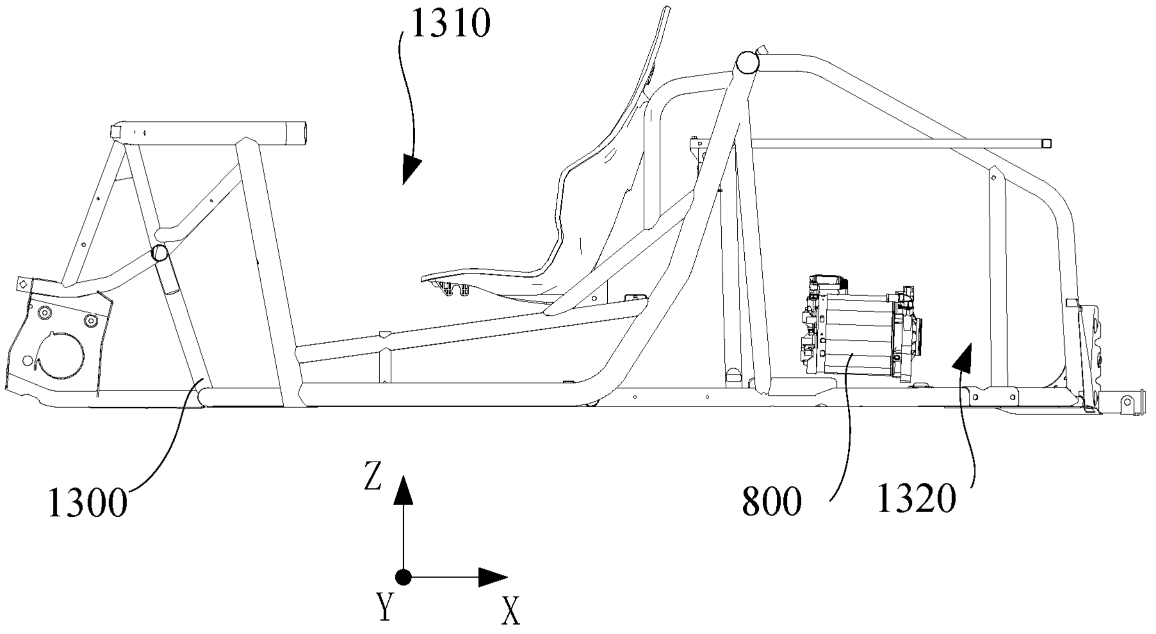
FIG. 7 is an arrangement diagram of a hybrid power assembly provided by an embodiment of the present application on a frame.
Figure 8:
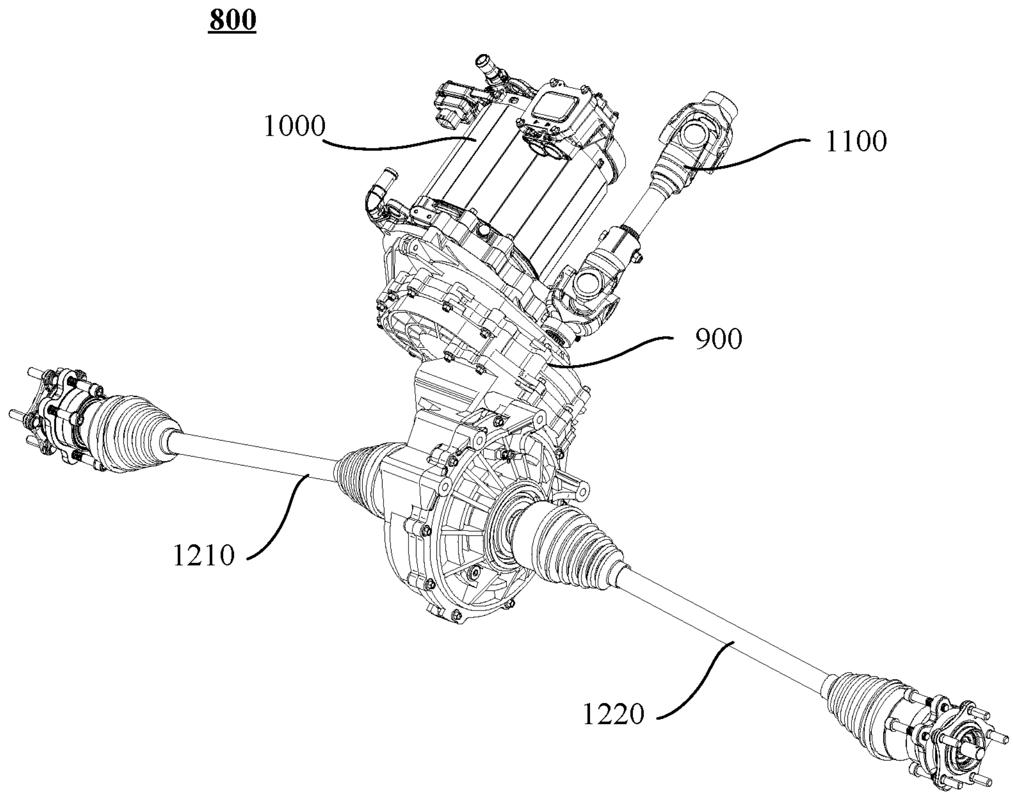
FIG. 8 is a structural diagram of one view of the hybrid power assembly provided by the embodiment of the present application.
Figure 9:
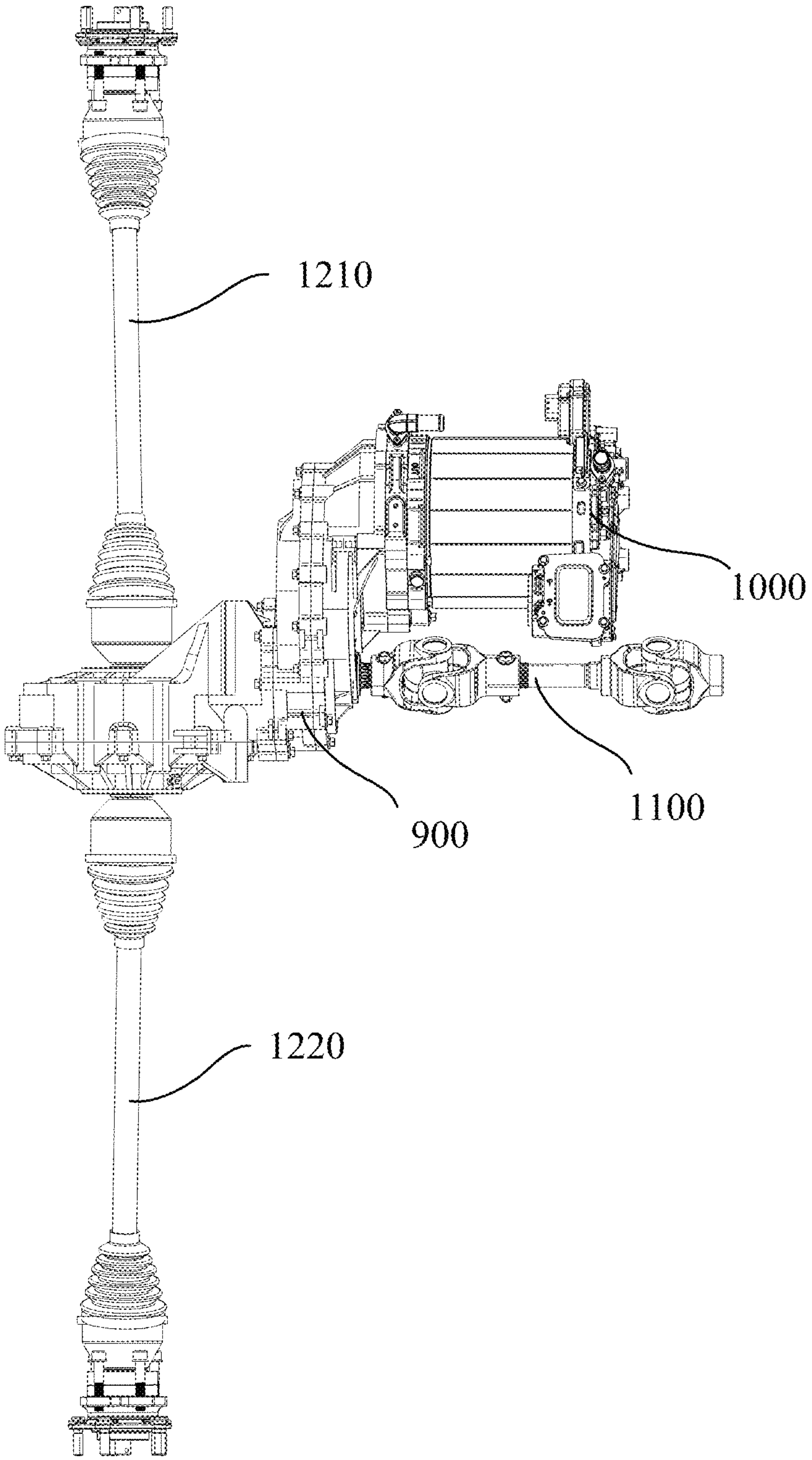
FIG. 9 is a structural diagram of another view of the hybrid power assembly provided by the embodiment of the present application.
Figure 10:
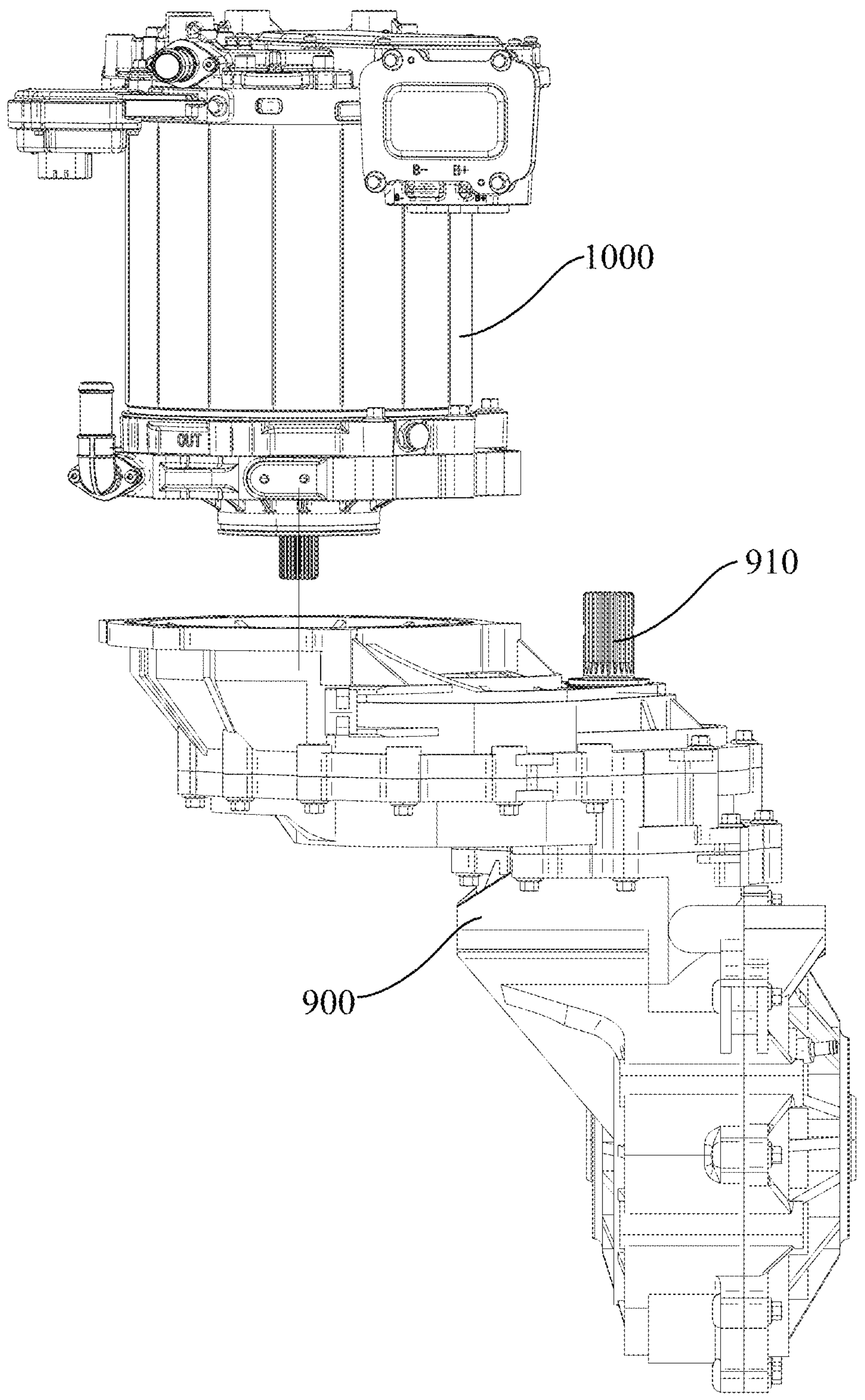
FIG. 10 is a connection diagram of an electric motor and a drive axle provided by an embodiment of the present application.
Figure 11:
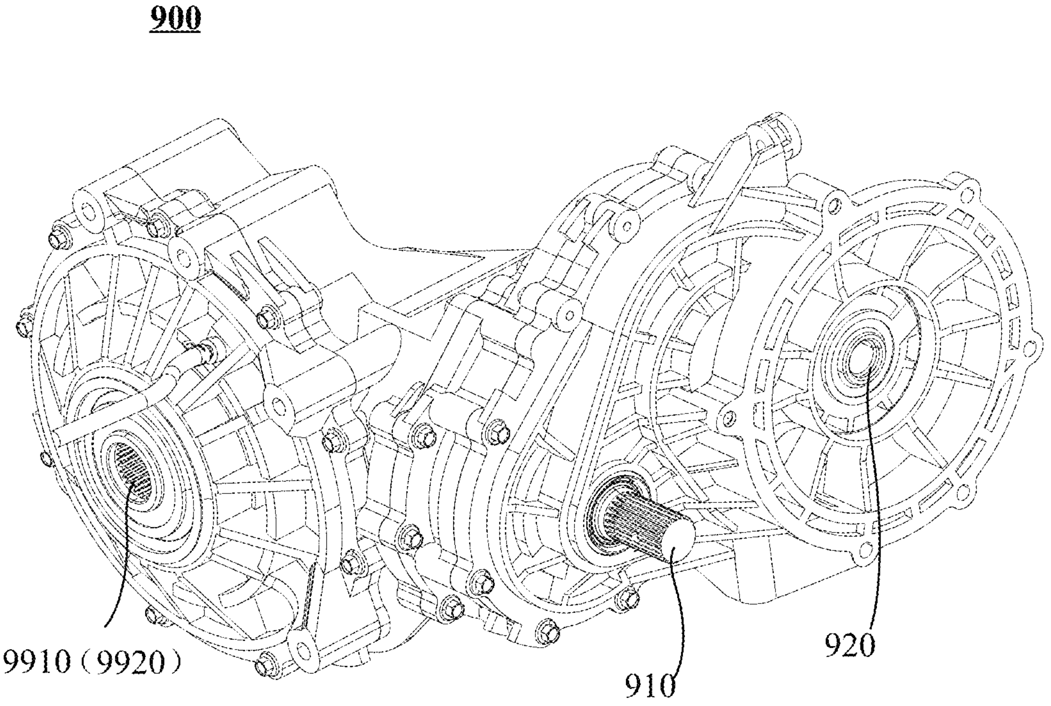
FIG. 11 is a structural diagram of a drive axle provided by an embodiment of the present application.

As shown in FIG. 7, an all-terrain vehicle provided by an embodiment of the present application may be a hybrid all-terrain vehicle, and the all-terrain vehicle includes a frame 1300, a wheelset, a power battery, and a hybrid power assembly 800, where the wheelset includes two front wheels and two rear wheels, the two front wheels are arranged at a front end of the frame 1300 along a first direction, and the two front wheels are rotationally connected to left and right sides of the frame 1300 along a second direction. Accordingly, the two rear wheels are arranged at a rear end of the frame 1300, and the two rear wheels are rotationally connected to the left and right sides of the frame 1300 along the second direction.

A hybrid power assembly 800 is arranged on the frame 1300 and the hybrid power assembly 800 is located at the bottom of the frame 1300 along a third direction. The hybrid power assembly 800 is configured to provide drive force, which may be transferred to the front wheels or the rear wheels of the all-terrain vehicle to move the all-terrain vehicle forward or backward, etc.

For example, a space of the frame 1300 may be divided into a first space 1310 and a second space 1320 along the first direction, where the first space 1310 may be configured as a cab for a passenger; and the second space 1320 is located at a rear side of the first space 1310, and the second space 1320 may be configured as a power compartment. The above-mentioned hybrid power assembly 800 may be arranged in the second space 1320, and the hybrid power assembly 800 can provide driving force to the rear wheels to cause the rear wheels to move forward or backward. The embodiment of the present application is described taking this as an example.

As shown in FIGS. 8 to 11, the hybrid power assembly 800 in the embodiment of the present application includes an engine, an electric motor 1000, and a drive axle 900, where the engine and the electric motor 1000 are arranged adjacent to the drive axle 900, and the electric motor 1000 and the engine assist each other and output power to achieve energy-saving effects, which can improve power performance of the vehicle.

For example, the engine and the electric motor 1000 are both in transmission connection with the drive axle 900 to cause power of the engine and power of the electric motor 1000 to be transferred to the drive axle 900 at the same time or individually. It should be noted that the engine refers to a fuel engine, the electric motor 1000 refers to a drive motor, and the power battery described above is configured to provide a drive current to the electric motor 1000 to cause the electric motor 1000 to generate power.

Specifically, the drive axle 900 includes a gear case and a first input shaft 910 and a second input shaft 920 which are arranged in the gear case, the first input shaft 910 and the second input shaft 920 are arranged in parallel and spaced apart in the gear case, and the first input shaft 910 and the second input shaft 920 may rotate with respect to the gear case; in other words, a rotation axis of the first input shaft 910 is parallel to a rotation axis of the second input shaft 920.

The first input shaft 910 is used for transmission connection with an output end of the engine to receive power from the engine; and the second input shaft 920 is used for transmission connection with an output end of the electric motor 1000 to receive power from the electric motor 1000, that is, the engine and the electric motor 1000 may input power to the drive axle 900. For example, the first input shaft 910 has a first plug-in mounting hole, and an output shaft of the engine is plugged into the first plug-in mounting hole and connected by a keyway; and the second input shaft 920 has a second plug-in mounting hole, and a drive shaft of the electric motor 1000 is plugged into the second plug-in mounting hole and connected by a keyway.

Figure 12:
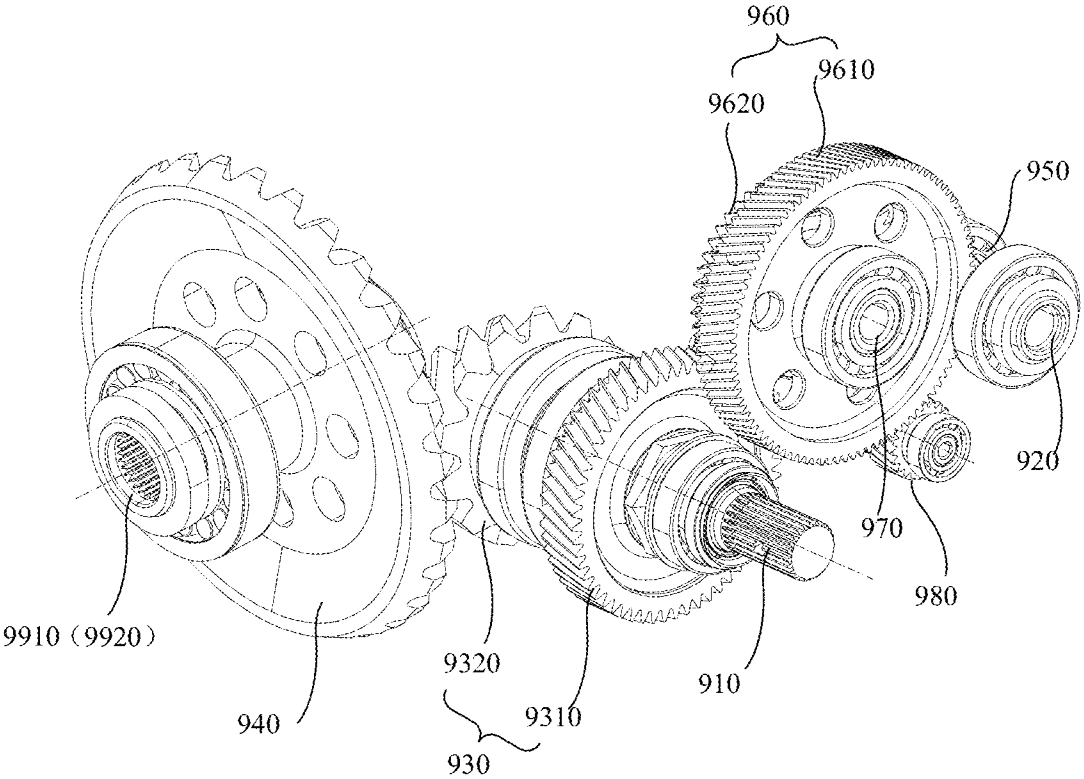
FIG. 12 is a structural diagram of an internal gear system of a drive axle provided by an embodiment of the present application.

As shown in FIG. 12, the drive axle 900 further includes a first transmission wheelset 930, a second transmission wheelset, and an output gear 940 arranged in the gear case, where the first transmission wheelset 930, the output gear 940 are sleeved on the first input shaft 910, to cause power of the first input shaft 910 to be transferred via the output gear 940, the output gear 940 is configured as an output end of the drive axle 900, and the output end may be in transmission connection with the rear wheels of the wheelset to transfer power to the rear wheels.

The first transmission wheelset 930 is in transmission connection with the second transmission wheelset, and the second transmission wheelset is sleeved on the second input shaft 920 to cause that power on the first input shaft 910 and the second input shaft 920 can be transferred to each other, that is, the power of the electric motor 1000 can be transferred to the second input shaft 920 via the second transmission wheelset and the first transmission wheelset 930, and further transferred to the output gear 940.

In detail, the first transmission wheelset 930 includes a first gear 9310 and a second gear 9320, where the first gear 9310 and the second gear 9320 are sleeved on the first input shaft 910, the first gear 9310 and the second gear 9320 are spaced apart along an extension direction of the first input shaft 910, and the first gear 9310 and the second gear 9320 rotate synchronously with the first input shaft 910.

The first gear 9310 is used for transmission connection with the second transmission wheelset; and the second gear 9320 is arranged adjacent to the output gear 940, and the second gear 9320 is engaged with the output gear 940. For example, a rotation axis of the second gear 9320 is staggered with a rotation axis of the output gear 940, and preferably, the rotation axis of the second gear 9320 is perpendicular to the rotation axis of the output gear 940. Such an arrangement can optimize the internal space layout of the gear case.

The second transmission wheelset includes a third gear 950, where the third gear 950 is sleeved on the second input shaft 920 and rotates synchronously with the second input shaft 920. The third gear 950 is in transmission connection with the first gear 9310, for example, the third gear 950 is directly engaged with the first gear 9310; or the third gear 950 is in transmission connection with the first gear 9310 via an intermediate gear.

Further, the hybrid power assembly 800 in the embodiment of the present application further includes a first output shaft 9910, a second output shaft 9920, a first half shaft 1210, and a second half shaft 1220, where the first output shaft 9910 and the second output shaft 9920 are arranged on two sides of the output gear 940, respectively, and ends of the first output shaft 9910 and the second output shaft 9920 which are adjacent to the output gear 940 are in transmission connection with the output gear 940, respectively, that is, power output from the hybrid power assembly 800 may be transferred to the first output shaft 9910 and the second output shaft 9920.

The first output shaft 9910 is in transmission connection with the first half shaft 1210, for example, the first half shaft 1210 is located on a side of the first output shaft 9910, one end of the first half shaft 1210 is in transmission connection with the first output shaft 9910, and the other end of the first half shaft 1210 is in transmission connection with one rear wheel of the wheelset. The second half shaft 1220 is located on a side of the second output shaft 9920, one end of the second half shaft 1220 is in transmission connection with the second output shaft 9920, and the other end of the second half shaft 1220 is in transmission connection with the other rear wheel of the wheelset. With such arrangement, output power of the hybrid power assembly 800 may be transferred to the rear wheels of the wheelset via the first half shaft 1210 and the second half shaft 1220 to cause the all-terrain vehicle to move forward or backward, etc.

It should be noted that for the hybrid power assembly 800 in the embodiment of the present application, the engine and the electric motor 1000 thereof may optionally provide power to the drive axle 900, that is, the engine may provide power to the drive axle 900 individually, to meet power requirements of the all-terrain vehicle when traveling long distances. And the electric motor 1000 may provide power to the drive axle 900 individually to save fuel and protect the environment; and the engine and the electric motor 1000 may provide power to the drive axle 900 at the same time to meet power requirements of the all-terrain vehicle when starting.

In the related art, a power input of an all-terrain vehicle only relies on an output shaft of an engine to transfer power to an axle power input shaft, and since a starting speed of the engine cannot be increased instantaneously and cannot reach a maximum torque output, starting acceleration performance is poor. However, power of the engine and the electric motor 1000 in the embodiment of the present application can be jointly input into the drive axle 900. Based on characteristics of electric drive, the electric motor 1000 can quickly reach maximum torque at startup, which can enable the all-terrain vehicle to quickly reach the maximum torque at startup, improving starting acceleration performance, and then improving user experience.

On the basis of the above embodiments, the hybrid power assembly 800 provided in the embodiment of the present application further includes a third transmission wheelset 960 and a transmission shaft 970, where the transmission shaft 970 is arranged in parallel between the first input shaft 910 and the second input shaft 920, the third transmission wheelset 960 includes a fourth gear 9610 and a fifth gear 9620, and the fourth gear 9610 and the fifth gear 9620 are sleeved on the transmission shaft 970 and rotate synchronously with the transmission shaft 970.

Furthermore, the fourth gear 9610 and the fifth gear 9620 have different numbers of teeth and radii. The fourth gear 9610 is engaged with the third gear 950 sleeved on the second input shaft 920, and the fifth gear 9620 is engaged with the first gear 9310 sleeved on the first input shaft 910, that is, the first input shaft 910 and the second input shaft 920 are in transmission connection via the third transmission wheelset 960, and the third transmission wheelset 960 can adjust a transmission ratio between the first gear 9310 and the third gear 950 and a rotation speed.

It should be noted that the first input shaft 910, the second input shaft 920, and the transmission shaft 970 are all in rotation connection in the gear case, and rotating bearings are arranged among the first input shaft 910, the second input shaft 920, the transmission shaft 970, and the gear case. Accordingly, the first transmission wheelset 930, the second transmission wheelset and the third transmission wheelset 960 are arranged in the gear case.

On the basis of the above embodiments, in order to ensure smooth rotation of the gears in the gear case, in the embodiment of the present application, lubricating oil and a lubricating gear 980 are arranged in the gear case, where the lubricating gear 980 is mounted in the gear case by a mounting shaft, and the lubricating gear 980 is engaged with the fourth gear 9610.

A part of the lubricating gear 980 is submerged below a liquid surface of the lubricating oil, for example, a bottom of the lubricating gear 980 is located below the liquid surface of the lubricating oil, and a top of the lubricating gear 980 is engaged with the fourth gear 9610. When the lubricating gear 980 rotates, the lubricating oil can be splashed or brought up, to lubricate at least the third gear 950, the fifth gear 9620 and the first gear 9310.

In an embodiment, the engine further includes a gearbox, where the output end of the engine is in transmission connection with an input shaft of the gearbox, and an output shaft 1100 of the gearbox is in transmission connection with the first input shaft 910, for example, the first input shaft has a first plug-in mounting hole, and the output shaft 1100 of the gearbox is plugged into the first plug-in mounting hole and connected by a keyway to transfer the power of the engine to the first input shaft 910 after being adjusted by the gearbox. With such arrangement, the power performance of the all-terrain vehicle can be further enhanced.

The hybrid power assembly 800 of the all-terrain vehicle in the embodiment of the present application includes a plurality of power modes in different scenarios, and the plurality of power modes include an engine drive mode, an electric drive mode, a hybrid power drive mode, and a charging mode. Power transferring of the power modes of the hybrid power assembly 800 in different modes is described in the following.

Engine Drive Mode

The power of the engine is transferred to the first input shaft 910 via the output shaft 1100 of the gearbox, and after being transferred to the second gear 9320 and the output gear 940 along the first input shaft 910, the power is distributed to the first half shaft 1210 and the second half shaft 1220 via the first output shaft 9910 and the second output shaft 9920, respectively, and is further transferred to the two rear wheels of the wheelset.

Electric Drive Mode

The power of the electric motor 1000 is transferred to the second input shaft 920 via the drive shaft thereof, the power is transferred to the first gear 9310 via the third gear 950, the fourth gear 9610, the transmission shaft 970, and the fifth gear 9620, and the power of the electric motor 1000 can be transferred to the first input shaft 910.

Next, after the power of the electric motor 1000 is transferred to the second gear 9320 and the output gear 940 along the first input shaft 910, the power is respectively distributed to the first half shaft 1210 and the second half shaft 1220 via the first output shaft 9910 and the second output shaft 9920, and is further transferred to the two rear wheels of the wheelset.

Hybrid Power Drive Mode

The hybrid power drive mode refers that: the engine and the electric motor 1000 thereof input power to the drive axle 900 at the same time, that is, the power of the engine is transferred to the first input shaft 910 via the output shaft 1100 of the gearbox; and at the same time, the power of the electric motor 1000 is transferred to the second input shaft 920 via the drive shaft thereof, and sequentially passing through the third gear 950, the fourth gear 9610, the transmission shaft 970, the fifth gear 9620, and the first gear 9310, the power of the electric motor 1000 can be transferred to the first input shaft 910, which will not be repeated herein.

Charging Mode

The charging mode refers to that when the all-terrain vehicle is running at a high speed, the engine can match required power thereof, and the electric motor 1000 may be configured as an electric generator at this time, to charge the power battery by means of a part of power of the engine.

In the charging mode, the power of the engine is transferred to the first input shaft 910 via the output shaft 1100 of the gearbox, and after being transferred to the second gear 9320 and the output gear 940 along the first input shaft 910, a part of the power is respectively distributed to the first half shaft 1210 and the second half shaft 1220 via the first output shaft 9910 and the second output shaft 9920, and is further transferred to the two rear wheels of the wheelset.

A part of the power is transferred to the transmission shaft 970 via the first gear 9310 and the fifth gear 9620, and the part of the power is transferred to the second input shaft 920 via the fourth gear 9610 and the third gear 950, and is further transferred to the drive shaft of the electric motor 1000, to enable the electric motor 1000 to acquire power and generate electricity.

It can be understood that the electric motor 1000 includes a power generating end and a driving end, and the drive shaft of the electric motor 1000 may be selectively in transmission connection with the driving end or the power generating end via a selection mechanism, for example, the selection mechanism includes a bidirectional synchronizer, etc. When the drive shaft of the electric motor 1000 is in transmission connection with the driving end, power may be output to the second output shaft 9920; and when the drive shaft of the electric motor 1000 is in transmission connection with the power generating end, power may be received and electricity may be generated.

On the other hand, a rear part of a frame of an all-terrain vehicle is generally used for arranging power units such as an engine, a motor, and a transmission rear axle, etc. In related art, since the power units are all centrally arranged at the rear of the frame, when an operator needs to detach and install an engine overhang, a transmission rear axle and other components individually, it is necessary to detach a whole structure thereof, which makes subsequent maintenance steps of the vehicle cumbersome and inconvenient to detach and install.

For the above technical problem, the embodiments of the present application provide an frame and an all-terrain vehicle, where since a rear axle and an engine rear overhang are respectively mounted to a first adapter frame and a second adapter frame, the first adapter frame or the second adapter frame can be removed from a main frame body individually without interfering with each other when there is need to detach the rear axle or the engine rear overhang, thereby facilitating detachment of the all-terrain vehicle, and since the first adapter frame and the second adapter frame are arranged on two sides of a width direction of the main frame body respectively, an operator can detach the rear axle or the engine rear overhang at one side of the width direction of the frame. Therefore, the frame and the all-terrain vehicle in the embodiments of the present application have reasonable structural designs and are easy to be detached and repaired.

As shown in FIGS. 13 to 17, the frame according to the embodiment of the present application includes: a main frame body 1410, a first adapter frame 1420 and a second adapter frame 1430, where a mounting cavity 1411 is formed in the main frame body 1410, the first adapter frame 1420 is used for mounting a rear axle 1500, the second adapter frame 1430 is used for mounting an engine rear overhang 1600, one of the first adapter frame 1420 and the second adapter frame 1430 is arranged adjacent to one side of a width direction of the main frame body 1410, and the other is arranged adjacent to the other side of the width direction of the main frame body 1410, and the first adapter frame 1420 and the second adapter frame 1430 are both arranged in the mounting cavity 1411, and are both detachably connected to the main frame body 1410.

It should be noted that the width direction of the frame 1400 is consistent with a second direction of the all-terrain vehicle, a length direction of the frame 1400 is consistent with a first direction of the all-terrain vehicle, and a third direction of the frame 1400 is consistent with a third direction of the all-terrain vehicle.

As for the frame 1400 according to the embodiment of the present application, since the rear axle 1500 and the engine rear overhang 1600 are mounted to the first adapter frame 1420 and the second adapter frame 1430, respectively, when the rear axle 1500 or the engine rear overhang 1600 needs to be detached and installed, the first adapter frame 1420 or the second adapter frame 1430 can be removed from the main frame body 1410 separately without interfering with each other, thereby facilitating detachment work of the all-terrain vehicle.

In addition, since the first adapter frame 1420 and the second adapter frame 1430 are arranged on two sides of the width direction of the main frame body 1410, respectively, it is possible for an operator to quickly detach and install the rear axle 1500 or the engine rear overhang 1600 from one side of the width direction of the frame 1400. In other words, since the rear axle 1500 or the engine rear overhang 1600 is arranged on the two sides of the width direction of the main frame body 1410, it is convenient for the operator's hands to enter the main frame body 1410. Therefore, the frame 1400 in the embodiment of the present application has a reasonable structural design and is easy to be detached and repaired.

For example, the first adapter frame 1420 is arranged adjacent to a left side of the main frame body 1410 and the second adapter frame 1430 is arranged adjacent to a right side of the main frame body 1410. For another example, the first adapter frame 1420 is arranged adjacent to the right side of the main frame body 1410 and the second adapter frame 1430 is arranged adjacent to the left side of the main frame body 1410.

It can be understood that when the rear axle 1500 needs to be removed from the frame 1400, the rear axle 1500 or an integrated component of the rear axle 1500 with the first adapter frame 1420 may be removed separately from a side of the main frame body 1410. Similarly, when the engine rear overhang 1600 needs to be removed from the frame 1400, the engine rear overhang 1600 or an integrated component of the engine rear overhang 1600 with the second adapter frame 1430 may be removed separately from a side of the main frame body 1410, which is conducive to improving detachment efficiency of components.

Figure 14:
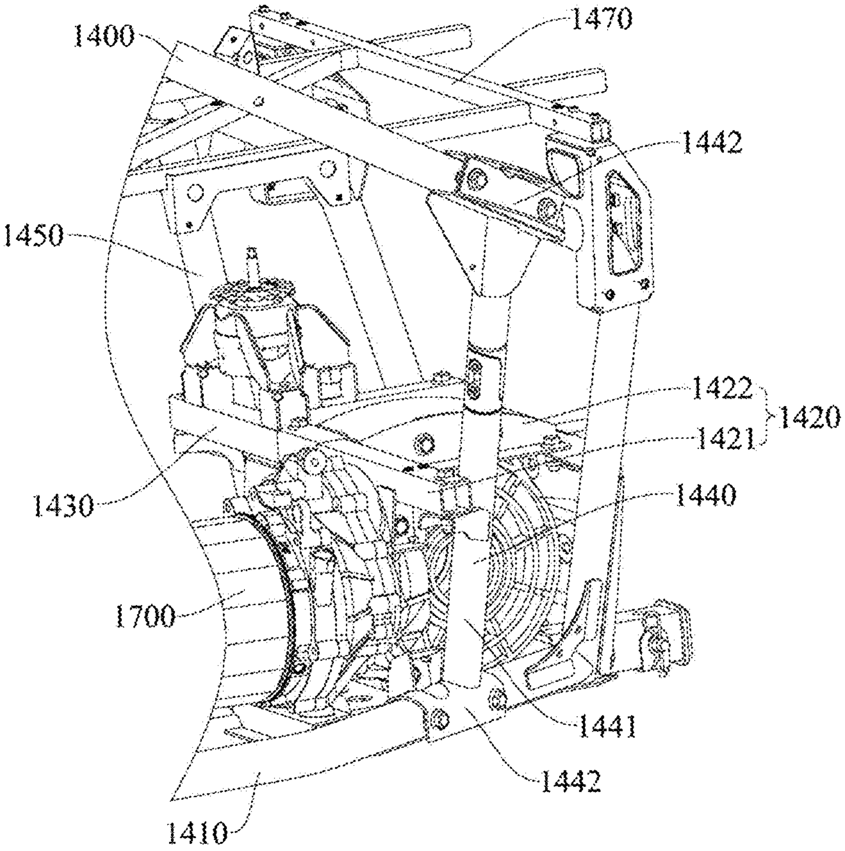
FIG. 14 is a partial view of a frame provided by an embodiment of the present application.

Optionally, as shown in FIG. 14, the first adapter frame 1420 is detachably connected to the second adapter frame 1430. It can be understood that sides of the first adapter frame 1420 and the second adapter frame 1430 which are adjacent to each other are connected to each other, thereby improving installation stability of the first adapter frame 1420 and the second adapter frame 1430, such that an overall structure of the frame 1400 is compact and connection strength is high, which is beneficial to improve use reliability of the frame 1400.

Figure 13:
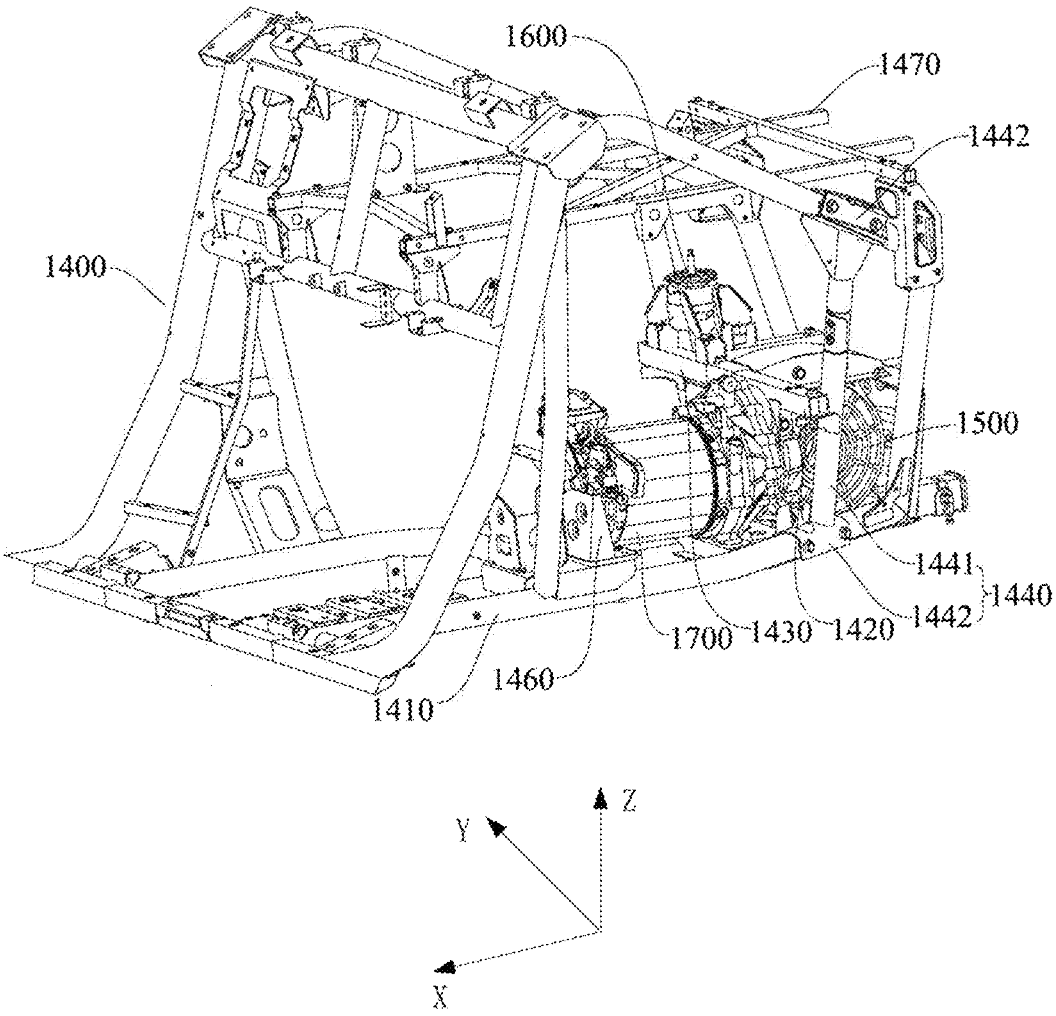
FIG. 13 is an axonometric diagram of another frame provided by an embodiment of the present application.

In an example, as shown in FIGS. 13 and 14, the first adapter frame 1420 and the main frame body 1410, the second adapter frame 1430 and the main frame body 1410, and the first adapter frame 1420 and the second adapter frame 1430 are all connected by screw element fixing, thereby facilitating processing and manufacturing of the frame 1400, improving connection stability of the frame 1400, and facilitating detachment.

In a possible implementation, as shown in FIGS. 14 to 17, the frame 1400 further includes a first vertical fender frame 1440, where the first vertical fender frame 1440 is mounted on a side of the width direction of the main frame body 1410 and arranged adjacent to the first adapter frame 1420, and the first vertical fender frame 1440 extends along the third direction of the main frame body 1410 and is detachably connected to the main frame body 1410. It can be understood that the first vertical fender frame 1440 stops at a left side or a right side of the mounting cavity 1411. Since the first vertical fender frame 1440 is detachably connected to the main frame body 1410, when the rear axle 1500 needs to be detached or repaired, the first vertical fender frame 1440 may be removed from the main frame body 1410 to facilitate maintenance operations by an operator. After the vehicle is repaired, the first vertical fender frame 1440 may be mounted on the main frame body 1410 to enhance strength and stiffness of the frame 1400, which is beneficial to improving overall reliability of the vehicle.

Figure 15:
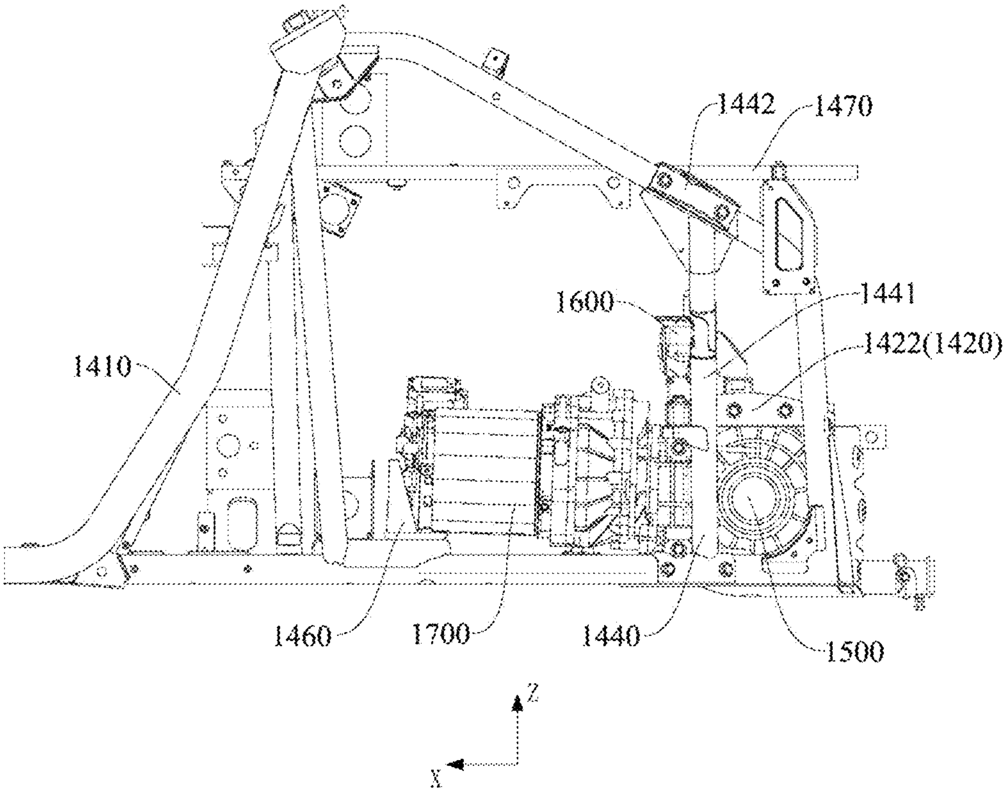
FIG. 15 is a side view of the frame provided by the embodiment of the present application.

Optionally, as shown in FIGS. 14 and 15, the first adapter frame 1420 includes a first section 1421 and a second section 1422, where the first section 1421 extends along the width direction of the main frame body 1410, the second section 1422 extends along the first direction of the main frame body 1410, one end of the first section 1421 along the extension direction thereof is detachably connected to the second adapter frame 1430, the other end of the first section 1421 along the extension direction thereof is detachably connected to the first vertical fender frame 1440, a front end of the second section 1422 is connected to the first section 1421, and a rear end of the second section 1422 is detachably connected to the main frame body 1410.

It can be understood that the first adapter frame 1420 is connected to the main frame body 1410, the first vertical fender frame 1440 and the second adapter frame 1430 at the same time, thereby not only improving overall connection stability of the frame 1400, but also causing a structure of the frame 1400 to be compact.

Optionally, as shown in FIGS. 14 and 15, the first vertical fender frame 1440 includes a fender frame body 1441 and two connecting seats 1442, where the two connecting seats 1442 are arranged at two ends of the fender frame body 1441, respectively, at least two first mounting positions are arranged on each of the connecting seats 1442, and at least two first cooperating positions are arranged on the main frame body 1410, and the first mounting positions correspond to the first cooperating positions one by one and are connected by screw elements.

It can be understood that, as shown in FIGS. 14 and 15, one connecting seat 1442 is mounted at an upper end of the fender frame body 1441, and the other connecting seat 1442 is mounted at a lower end of the fender frame body 1441. Taking the connecting seat 1442 at the upper end of the fender frame body 1441 as an example, the connecting seat 1442 and the fender frame body 1441 may be integrally formed or may be connected detachably. Two first mounting positions are arranged on the connecting seat 1442 and are spaced apart, two first cooperating positions are arranged on the main frame body 1410, and screw elements pass through the first cooperating positions and the first mounting positions. It can be understood that two point positions of the connecting seat 1442 are connected to the main frame body 1410, and a third point position of the connecting seat 1442 is connected to the fender frame body 1441, thereby forming a stable triangular support structure, which further improves connection reliability of the frame 1400.

Figure 16:
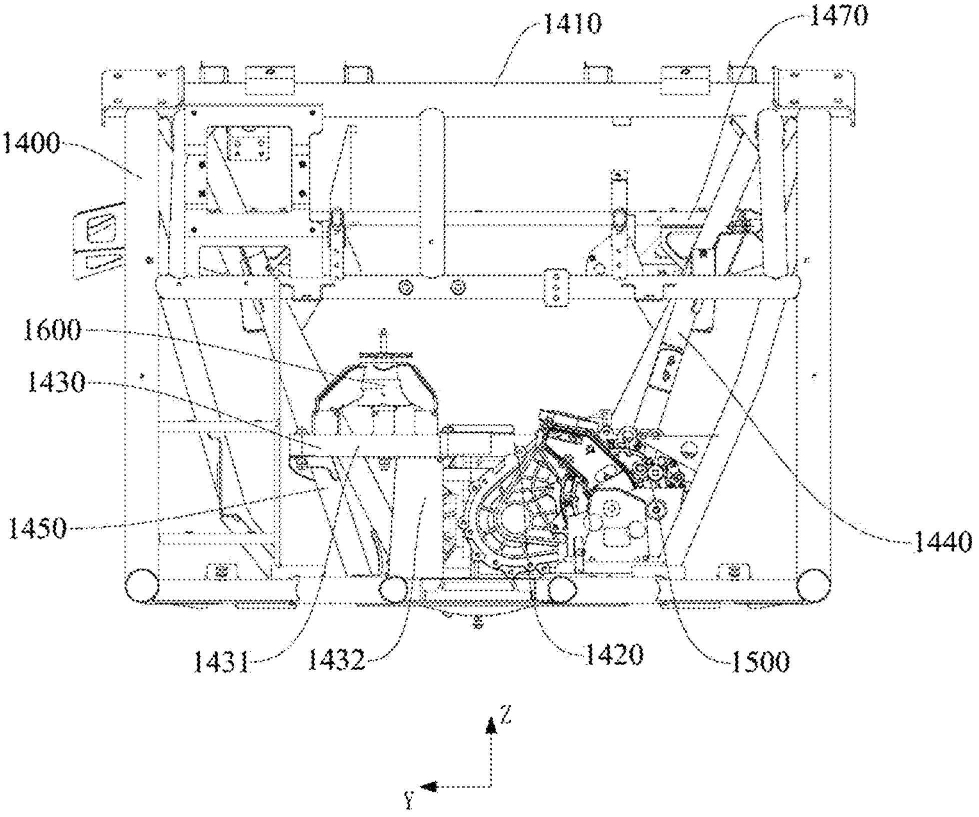
FIG. 16 is a front view of the frame provided by the embodiment of the present application.
Figure 17:
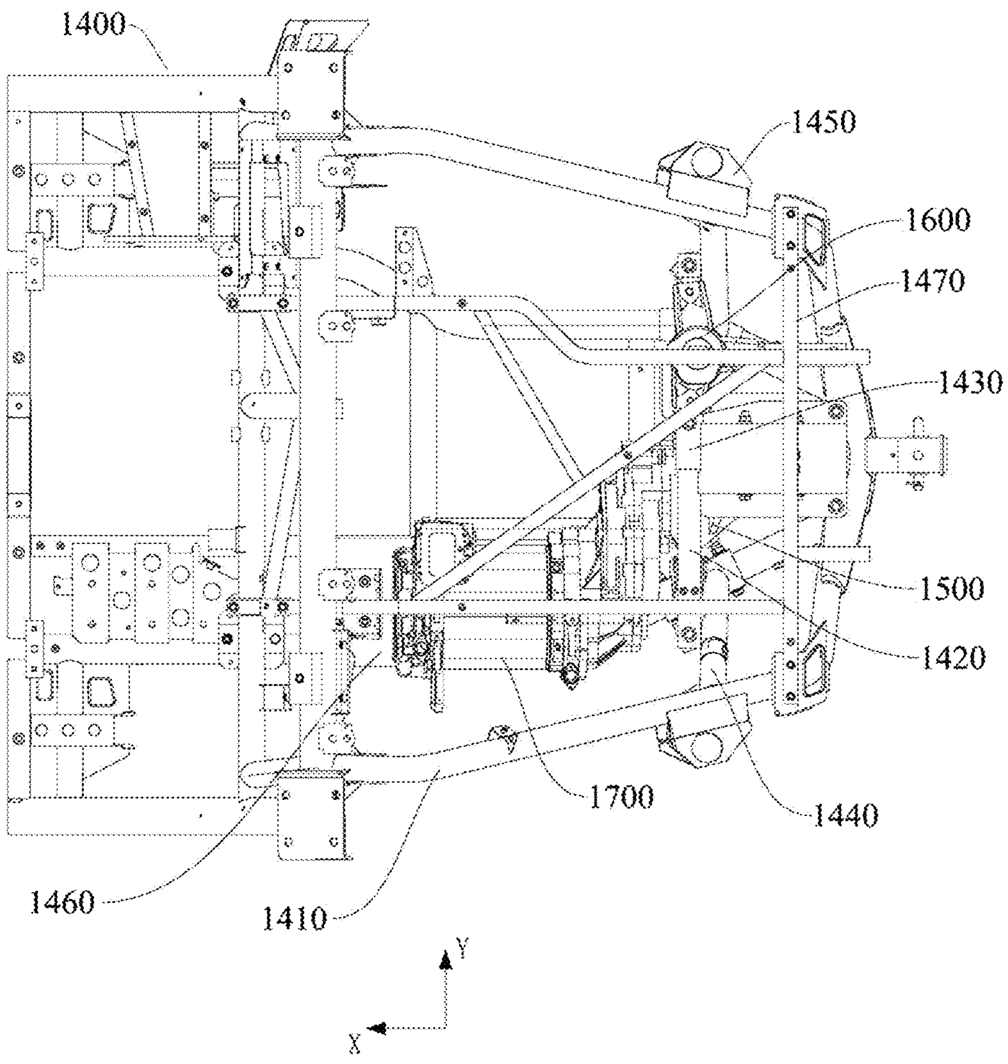
FIG. 17 is a top view of the frame provided by the embodiment of the present application.

In a possible implementation, as shown in FIGS. 16 and 17, the frame 1400 further includes a second vertical fender frame 1450, where the second vertical fender frame 1450 is mounted to a side of the width direction of the main frame body 1410 and arranged adjacent to the second adapter frame 1430, and the second vertical fender frame 1450 extends along the third direction of the main frame body 1410 and is detachably connected to the main frame body 1410. For example, the first vertical fender frame 1440 is mounted on a left side of the main frame body 1410 and the second vertical fender frame 1450 is mounted on a right side of the main frame body 1410.

It can be understood that, since the second vertical fender frame 1450 is detachably connected to the main frame body 1410, when the engine rear overhang 1600 needs to be detached and installed or repaired, the second vertical fender frame 1450 may be removed from the main frame body 1410 to facilitate an operator's maintenance work. After the vehicle is repaired, the second vertical fender frame 1450 may be mounted on the main frame body 1410 to enhance the strength and stiffness of the frame 1400, which is beneficial to improving the overall reliability of the vehicle.

For example, as shown in FIGS. 16 and 17, a structure of the second vertical fender frame 1450 and a structure of the first vertical fender frame 1440 are substantially the same and are symmetrically arranged on two sides of the width direction of the main frame body 1410 to improve overall stability of the frame 1400.

Optionally, as shown in FIG. 16, the second adapter frame 1430 includes a third section 1431 and a fourth section 1432, where the third section 1431 extends along the width direction of the main frame body 1410, the fourth section 1432 extends along the third direction of the main frame body 1410, an end of the third section 1431 along the extension direction thereof is detachably connected to the second vertical fender frame 1450, and the other end of the third section 1431 along the extension direction thereof is detachably connected to the first adapter frame 1420, an upper end of the fourth section 1432 is connected to the third section 1431, and a lower end of the fourth section 1432 is detachably connected to the main frame body 1410. It can be understood that the second adapter frame 1430 is connected to the main frame body 1410, the second vertical fender frame 1450, and the first adapter frame 1420 at the same time, thereby not only improving the overall connection stability of the frame 1400, but also causing the structure of the frame 1400 to be compact.

In a possible implementation, as shown in FIGS. 13 and 15, the frame 1400 further includes a motor fixing seat 1460, where the motor fixing seat 1460 is used for mounting a second motor 1700, the motor fixing seat 1460 is arranged at a front end of the first adapter frame 1420, and the motor fixing seat 1460 is arranged in the mounting cavity 1411 and detachably connected to the main frame body 1410. For example, the motor fixing seat 1460 may be fixed to the main frame body 1410 by means of screw element fixing, which facilitates installation and detachment of the second motor 1700 and can improve installation reliability of the second motor 1700.

Optionally, as shown in FIGS. 13 to 17, the frame 1400 further includes a cargo box mounting frame 1470, where the cargo box mounting frame 1470 is arranged on an upper side of the mounting cavity 1411, and the cargo box mounting frame 1470 is detachably connected to the main frame body 1410. For example, the cargo box mounting frame 1470 may be fixed to the main frame body 1410 by means of screw element fixing. By connecting the cargo box mounting frame 1470 in the above method, the frame 1400 in the embodiment of the present application can enable the overall structure of the frame 1400 to be compact and enable the connection strength and rigidity to be higher, which is beneficial to improving the overall stability of the frame 1400.

For example, a plurality of second mounting positions are arranged on the cargo box mounting frame 1470, where a part of the second mounting positions are arranged at a front end of the cargo box mounting frame 1470, and the other part of the second mounting positions are arranged at a rear end of the cargo box mounting frame 1470; and a plurality of second cooperating positions are arranged on the main frame body 1410, and the plurality of second cooperating positions and the plurality of second mounting positions one-to-one correspond to each other and are connected by screw elements to improve installation firmness of the cargo box mounting frame 1470.

As shown in FIGS. 13 to 17, an all-terrain vehicle in another embodiment of the present application includes a frame 1400, a rear axle 1500, an engine rear overhang 1600, and a second motor 1700. The frame 1400 is the frame 1400 in the present application, the rear axle 1500 is connected to a first adapter frame 1420, the engine rear overhang 1600 is connected to a second adapter frame 1430, and the second motor 1700 is connected to a motor fixing seat 1460.

As for the all-terrain vehicle according to the embodiment of the present application, since the rear axle 1500 and the engine rear overhang 1600 are mounted to the first adapter frame 1420 and the second adapter frame 1430, respectively, when the rear axle 1500 or the engine rear overhang 1600 needs to be detached and installed, the first adapter frame 1420 or the second adapter frame 1430 may be removed from the main frame body 1410 individually without interfering with each other, thereby facilitating detachment work of the all-terrain vehicle; and since the first adapter frame 1420 and the second adapter frame 1430 are arranged on two sides of the width direction of the main frame body 1410, respectively, an operator can detach the rear axle 1500 or the engine rear overhang 1600 at one side of the width direction of the frame 1400. Therefore, the all-terrain vehicle in the embodiments of the present application has a reasonable structural design and is easy to be detached and repaired.

In the description of the present application, it should be understood that orientations or positional relationships indicated by terms "center", "longitudinal", "lateral", "length", "width", "thickness", "upper", "lower", "front", "rear", "left", "right", "vertical", "horizontal", "top", "bottom", "inside", "outside", "clockwise", "counterclockwise", "axial", "radial", "circumferential", etc., are based on orientations or positional relationships shown in the drawings, and are intended only to facilitate the description of the present application and to simplify the description, and are not intended to indicate or imply that an apparatus or an element referred to must have a particular orientation or be constructed and operated with a particular orientation, and thus cannot be construed as a limitation on the present application.

In the present application, unless otherwise clearly specified and limited, terms such as "mounted", "connected", "connection", "fixed", etc., should be understood in a broad sense. For example, a connection may be a fixed connection, a detachable connection, or an integral connection; a connection may be a direct connection or an indirect connection through an intermediate medium; and a connection may be an internal connection of two elements or an interaction relationship between the two elements. For a person of ordinary skill in the art, specific meanings of the above terms in the present application may be understood according to specific circumstances.

It should be noted that in the description of the present application, terms "first" and "second" are used only for convenience in describing different components and are not to be construed as indicating or implying sequential relationships, relative importance, or implicitly specifying the number of technical features indicated. Therefore, a feature defined by "first" or "second" may explicitly or implicitly include at least one said feature.

Various embodiments or implementations in the present application are described in a progressive way. Each embodiment focuses on differences from other embodiments, and same or similar parts among the various embodiments may refer to one another.

In the description of the present application, a description with reference to terms such as "an implementation", "some implementations", "schematic implementation", "example", "specific example", or "some examples", etc., means that specific features, structures, materials or characteristics described in combination with implementations or examples are included in at least one implementation or example of the present application. In the present application, schematic expressions of the above terms do not necessarily refer to same implementations or examples. Moreover, specific features, structures, materials, or characteristics described may be combined in any one or more implementations or the examples in a suitable way.

Finally, it should be noted that the above embodiments are only used to illustrate the technical solutions of the present application, rather than to limit them. Although the present application has been described in detail with reference to the aforementioned embodiments, persons of ordinary skill in the art should understand that: they can still modify the technical solutions described in the aforementioned embodiments, or make equivalent substitutions for some or all of technical features therein; and these modifications or substitutions do not cause the essence of the corresponding technical solutions to deviate from the scope of the technical solutions in the embodiments of the present application.

The invention claimed is:

1. A hybrid assembly, comprising an engine, a gearbox, a battery, a first motor, a front axle and a hybrid rear axle, wherein the front axle, the battery, and the hybrid rear axle are arranged sequentially along a first direction, the battery is connected to the hybrid rear axle via the first motor, the engine and the gearbox are arranged between the battery and the hybrid rear axle, and the gearbox is arranged on a side of the engine facing the front axle; and the engine is arranged along the first direction, an output end of the engine is connected to the gearbox along the first direction, the gearbox is connected to the front axle via a front transmission shaft arranged along the first direction, and the gearbox is connected to the hybrid rear axle via a rear transmission shaft arranged along the first direction.

2. The hybrid assembly according to claim 1, wherein the gearbox is an automatic shift gearbox, the first motor is arranged on the hybrid rear axle, the battery is connected to the first motor via a high voltage cable, wherein a motor controller is arranged in the first motor, the motor controller is communicatively connected to the first motor, and the motor controller is configured to control a rotation direction of the first motor.

3. The hybrid assembly according to claim 1, further comprising a controller, wherein the controller is communicatively connected to the engine and the battery, and the controller controls the engine and the battery to work at the same time or individually to cause the hybrid assembly to be in different working states.

4. The hybrid assembly according to claim 3, wherein when the hybrid assembly is in a first working state, the engine and the battery work at the same time, power output from the engine is transferred to the front axle and the hybrid rear axle via the gearbox, the battery enables the first motor to rotate, and power output from the first motor is transferred to the hybrid rear axle;

when the hybrid assembly is in a second working state, the engine works individually, and the power output from the engine is transferred to the front axle and the hybrid rear axle via the gearbox;

when the hybrid assembly is in a third working state, the battery works individually, the battery enables the first motor to rotate, and a part of the power output from the first motor is transferred to the hybrid rear axle, and the other part of the power output from the first motor is transferred to the front axle via the hybrid rear axle and the gearbox;

when the hybrid assembly is in a fourth working state, the engine works individually, a part of the power output from the engine is transferred to the front axle and the hybrid rear axle via the gearbox, and the other part of the power output from the engine is transferred to the first motor via the hybrid rear axle, and the first motor converts kinetic energy into electrical energy and then charges the battery; and when the hybrid assembly is in a fifth working state, the engine works individually, the power output from the engine is transferred to the first motor via the hybrid rear axle, and the first motor converts kinetic energy into electrical energy and then charges the battery.

5. A hybrid all-terrain vehicle, comprising a frame, wheels, and the hybrid assembly according to claim 1, wherein the frame comprises a cab and a power compartment arranged sequentially along the first direction, the battery is arranged in the cab, and the engine, the gearbox, and the first motor are arranged in the power compartment; and the wheels comprise a front wheel and a rear wheel, the front wheel is connected to the front axle via a front half shaft, and the rear wheel is connected to the hybrid rear axle via a rear half shaft.

6. The hybrid all-terrain vehicle according to claim 5, wherein the cab further comprises a seat, the battery is arranged under the seat, and the engine, the gearbox, and the first motor are all arranged on a side of the seat facing the rear wheel.

7. A hybrid power assembly, comprising a drive axle, an engine, an electric motor, a first output shaft, a second output shaft, a first half shaft and a second half shaft;

wherein the drive axle comprises a first input shaft and a second input shaft arranged in parallel, the first input shaft being in transmission connection with an output end of the engine and the second input shaft being in transmission connection with an output of the electric motor;

the first output shaft and the second output shaft are respectively in transmission connection with the drive axle and arranged on two sides of the drive axle;

the first half shaft is located on a side of the first output shaft and is in transmission connection with the first output shaft; and the second half shaft is located on a side of the second output shaft and is in transmission connection with the second output shaft.

8. The hybrid power assembly according to claim 7, wherein the drive axle further comprises a first transmission wheelset, a second transmission wheelset, and an output gear;

wherein the first transmission wheelset comprises a first gear and a second gear, the first gear and the second gear being sleeved on the first input shaft and rotating synchronously;

the first gear is in transmission connection with the second transmission wheelset, the second gear is engaged with the output gear, and the output gear is respectively in transmission connection with the first output shaft and the second output shaft; and the second transmission wheelset comprises a third gear being in transmission connection with the first gear, and the third gear is sleeved on the second input shaft.

9. The hybrid power assembly according to claim 8, wherein a rotation axis of the output gear is staggered with a rotation axis of the second gear.

10. The hybrid power assembly according to claim 8, wherein the hybrid power assembly further comprises a third transmission wheelset and a transmission shaft;

wherein the transmission shaft is arranged in parallel between the first input shaft and the second input shaft, the third transmission wheelset comprises a fourth gear and a fifth gear with different numbers of teeth, the fourth gear is engaged with the third gear, and the fifth gear is engaged with the first gear; and the fourth gear and the fifth gear are sleeved on the transmission shaft and rotate synchronously.

11. The hybrid power assembly according to claim 10, wherein the drive axle further comprises a gear case, and the first input shaft, the second input shaft, and the transmission shaft are in rotation connection within the gear case; and the first transmission wheelset, the second transmission wheelset, and the third transmission wheelset are all arranged in the gear case.

12. The hybrid power assembly according to claim 11, wherein a lubricating oil and a lubricating gear are arranged in the gear case; and the lubricating gear is engaged with the fourth gear, and a part of the lubricating gear is submerged below a liquid surface of the lubricating oil.

13. The hybrid power assembly according to claim 7, wherein the engine further comprises a gearbox;

the output end of the engine is in transmission connection with an input shaft of the gearbox, and an output shaft of the gearbox is in transmission connection with the first input shaft;

the first input shaft has a first plug-in mounting hole, and the output shaft of the gearbox is plugged into the first plug-in mounting hole and connected by a keyway; and the second input shaft has a second plug-in mounting hole, and a drive shaft of the electric motor is plugged into the second plug-in mounting hole and connected by a keyway.

14. A frame, comprising:

a main frame body, wherein a mounting cavity is formed in the main frame body; and a first adapter frame and a second adapter frame, wherein the first adapter frame is used for mounting a rear axle, the second adapter frame is used for mounting an engine rear overhang, one of the first adapter frame and the second adapter frame is arranged adjacent to one side of a width direction of the main frame body and the other is arranged adjacent to the other side of the width direction of the main frame body, and the first adapter frame and the second adapter frame are both arranged in the mounting cavity and both are detachably connected to the main frame body.

15. The frame according to claim 14, wherein the first adapter frame is detachably connected to the second adapter frame.

16. The frame according to claim 14, further comprising a first vertical fender frame, wherein the first vertical fender frame is mounted on a side of the width direction of the main frame body and arranged adjacent to the first adapter frame, and the first vertical fender frame extends along a third direction of the main frame body and is detachably connected to the main frame body.

17. The frame according to claim 16, wherein the first adapter frame comprises a first section and a second section, wherein the first section extends along the width direction of the main frame body, the second section extends along a first direction of the main frame body, one end of the first section along an extension direction thereof is detachably connected to the second adapter frame, and the other end of the first section along the extension direction thereof is detachably connected to the first vertical fender frame, a front end of the second section is connected to the first section, and a rear end of the second section is detachably connected to the main frame body; and the first vertical fender frame comprises a fender frame body and two connecting seats, the two connecting seats are respectively arranged at two ends of the fender frame body, at least two first mounting positions are arranged on the connecting seats, at least two first cooperating positions are arranged on the main frame body, and the first mounting positions and the first cooperating positions one-to-one correspond to each other and are connected by screw elements.

18. The frame according to claim 14, further comprising a second vertical fender frame, wherein the second vertical fender frame is mounted on a side of the width direction of the main frame body and arranged adjacent to the second adapter frame, and the second vertical fender frame extends along a third direction of the main frame body and is detachably connected to the main frame body; and the second adapter frame comprises a third section and a fourth section, the third section extends along the width direction of the main frame body, the fourth section extends along the third direction of the main frame body, one end of the third section along extension direction thereof is detachably connected to the second vertical fender frame, the other end of the third section along the extension direction thereof is detachably connected to the first adapter frame, an upper end of the fourth section is connected to the third section, and a lower end of the fourth section is detachably connected to the main frame body.

19. The frame according to claim 14, further comprising a motor fixing seat, wherein the motor fixing seat is used for mounting a second motor, the motor fixing seat is arranged at a front end of the first adapter frame, and the motor fixing seat is arranged in the mounting cavity and is detachably connected to the main frame body.

20. The frame according to claim 14, further comprising a cargo box mounting frame, wherein the cargo box mounting frame is arranged on an upper side of the mounting cavity, and the cargo box mounting frame is detachably connected to the main frame body.

* * * * *